United States Patent
Goshima et al.

(10) Patent No.: US 12,405,798 B2
(45) Date of Patent: Sep. 2, 2025

(54) INSTRUCTION PROCESSING APPARATUS AND INSTRUCTION PROCESSING METHOD

(71) Applicants: Fujitsu Limited, Kawasaki (JP); Inter-University Research Institute Corporation Research Organization of Information and Systems, Tachikawa (JP)

(72) Inventors: Masahiro Goshima, Chiyoda (JP); Yi Ge, Bunkyo (JP)

(73) Assignees: Fujitsu Limited, Kawasaki (JP); Inter-University Research Institute Corporation Research Organization of Information and Systems, Tokyo (JP)

( * ) Notice: Subject to any disclaimer, the term of this patent is extended or adjusted under 35 U.S.C. 154(b) by 146 days.

(21) Appl. No.: 18/209,317

(22) Filed: Jun. 13, 2023

(65) Prior Publication Data
US 2024/0053990 A1    Feb. 15, 2024

(30) Foreign Application Priority Data

Aug. 12, 2022 (JP) ................................ 2022-128821

(51) Int. Cl.
  *G06F 9/30* (2018.01)
  *G06F 9/38* (2018.01)

(52) U.S. Cl.
  CPC ........ *G06F 9/3836* (2013.01); *G06F 9/30145* (2013.01); *G06F 9/3826* (2013.01);
  (Continued)

(58) Field of Classification Search
  CPC .. G06F 9/3836; G06F 9/30145; G06F 9/3826; G06F 9/3838; G06F 9/3858; G06F 9/3001
  See application file for complete search history.

(56) References Cited

U.S. PATENT DOCUMENTS

| | | | | |
|---|---|---|---|---|
| 5,548,738 A | * | 8/1996 | Song | G06F 9/3858 712/E9.071 |
| 6,990,568 B2 | * | 1/2006 | Burch | G06F 9/3854 712/E9.032 |

(Continued)

FOREIGN PATENT DOCUMENTS

| | | |
|---|---|---|
| JP | 2017-509063 A | 3/2017 |
| JP | 2017-537408 A | 12/2017 |

(Continued)

OTHER PUBLICATIONS

T. Katsu et al., "Out-of-Step Pipelines for Efficient Gathering/Scatter", Information Processing Society of Japan Technical Report, Mar. 18, 2021, vol. 2021-ARC-244, No. 36, pp. 1-15, with partial translation. (16 pages).

*Primary Examiner* — Corey S Faherty
(74) *Attorney, Agent, or Firm* — WHDA, LLP

(57) ABSTRACT

An instruction processing apparatus including a processor configured to execute a process including issuing, by an instruction scheduler, instructions that can be executed; holding, by a register file, data used by the instructions; executing, by an execution unit including a plurality of stages, the instructions issued by the instruction scheduler; detecting, by a detector, early termination in which an execution result of an intermediate stage, which is before a final stage among the plurality of stages, is the same as an execution result of the execution unit; and transferring, by a bypass controller, the data output from the register file or the execution result from the execution unit, to an input of the execution unit, and in response to the detector detecting the early termination, bypassing the execution result of the intermediate stage to the input of the execution unit.

20 Claims, 30 Drawing Sheets

(52) U.S. Cl.
CPC .......... *G06F 9/3838* (2013.01); *G06F 9/3858* (2023.08); *G06F 9/3001* (2013.01)

(56) References Cited

U.S. PATENT DOCUMENTS

| | | | | |
|---|---|---|---|---|
| 7,669,039 B2* | 2/2010 | McIlvaine | ............. | G06F 9/3856 |
| | | | | 712/217 |
| 8,769,247 B2* | 7/2014 | Estlick | ................. | G06F 9/3856 |
| | | | | 712/218 |
| 9,778,907 B2* | 10/2017 | Elmer | ................... | G06F 9/3893 |
| 9,891,887 B2* | 2/2018 | Elmer | ................... | G06F 7/5443 |
| 2016/0179551 A1 | 6/2016 | Barowski et al. | | |
| 2016/0364239 A1 | 12/2016 | Lechenko et al. | | |
| 2019/0018684 A1* | 1/2019 | Barrick | ................. | G06F 9/3851 |

FOREIGN PATENT DOCUMENTS

| | | |
|---|---|---|
| JP | 2018-523242 A | 8/2018 |
| WO | 2016/093975 A1 | 6/2016 |
| WO | 2017/030692 A1 | 2/2017 |

* cited by examiner

| | WHEN c IS NOT "0" IN PRECEDING INSTRUCTION fmadd (a * b + c) | WHEN c IS "0" IN PRECEDING INSTRUCTION fmadd (a * b + c) |
|---|---|---|
| CONSTANTLY OPERATE IN WORST EXECUTION LATENCY | PRECEDING INSTRUCTION (fmadd): I0 I1 E0 E1 E2 E3<br>SUBSEQUENT DEPENDENT INSTRUCTION: I0 I1 E0 | WASTEFUL WAITING<br>PRECEDING INSTRUCTION (fmadd): I0 I1 E0 E1 E2 E3<br>SUBSEQUENT DEPENDENT INSTRUCTION: I0 I1 E0 |
| CONSTANTLY OPERATE IN SHORTENED EXECUTION LATENCY | PRECEDING INSTRUCTION (fmadd): I0 I1 E0 E1 E2 E3<br>SUBSEQUENT DEPENDENT INSTRUCTION: I0 I1 ✗ E0<br>CANCEL, REISSUE | PRECEDING INSTRUCTION (fmadd): I0 I1 E0 E1 E2 E3<br>SUBSEQUENT DEPENDENT INSTRUCTION: I0 I1 E0 |
| OPERATION OF INSTRUCTION PROCESSING APPARATUS 10B IN FIGS. 3, 4 | PRECEDING INSTRUCTION (fmadd): I0 I1 E0 E1 E2 E3<br>SUBSEQUENT DEPENDENT INSTRUCTION: I0 I1 E0<br>STALL | PRECEDING INSTRUCTION (fmadd): I0 I1 E0 E1 E2 E3<br>SUBSEQUENT DEPENDENT INSTRUCTION: I0 I1 E0 |

INSTRUCTION PROCESSING APPARATUS AND INSTRUCTION PROCESSING METHOD

CROSS-REFERENCE TO RELATED APPLICATION

This patent application is based upon and claims the benefit of priority of the prior Japanese Patent Application No. 2022-128821 filed on Aug. 12, 2022, the entire contents of which are incorporated herein by reference.

FIELD

The present invention relates to an instruction processing apparatus and an instruction processing method.

BACKGROUND

It is known that a processor is equipped with an instruction scheduler that issues instructions to the instruction execution units in the order in which the instructions can be executed, and improves processing performance by executing out-of-order processing (see, e.g., Patent Documents 1 to 5).

Patent Document 1: Japanese National Publication of International Patent Application No. 2017-509063
Patent Document 2: Japanese National Publication of International Patent Application No. 2018-523242
Patent Document 3: U.S. Unexamined Patent Application Publication No. 2019/0018684
Patent Document 4: Japanese National Publication of International Patent Application No. 2017-537408
Patent Document 5: U.S. Unexamined Patent Application Publication No. 2016/0179551

SUMMARY

According to an aspect of the embodiments, an instruction processing apparatus includes a processor configured to execute a process including issuing, by an instruction scheduler, instructions that can be executed; holding, by a register file, data used by the instructions; executing, by an execution unit including a plurality of stages, the instructions issued by the instruction scheduler; detecting, by a detector, early termination in which an execution result of an intermediate stage, which is before a final stage among the plurality of stages, is the same as an execution result of the execution unit; and transferring, by a bypass controller, the data output from the register file or the execution result from the execution unit, to an input of the execution unit, and in response to the detector detecting the early termination, bypassing the execution result of the intermediate stage to the input of the execution unit.

The object and advantages of the invention will be implemented and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 9 is an explanatory diagram illustrating an example of a pipeline instruction when performing a floating-point multiply-add instruction;
FIG. 10 is an explanatory diagram illustrating an example of pipeline instruction from another point of view when performing a floating-point multiply-add instruction.

DESCRIPTION OF EMBODIMENTS

An instruction processing apparatus that executes out-of-order processing determines the number of cycles of instruction execution by an instruction execution unit at the time of issuing an instruction from the instruction scheduler. The number of cycles of instruction execution is also referred to as the execution latency. The execution result is then bypassed to the input of the execution unit in a cycle corresponding to the determined execution latency. On the other hand, the net execution latency of the execution unit varies depending on the input data or the type of instruction.

For example, when a multiply-add instruction and a multiplication instruction are respectively executed by a multiply-add unit including a multiplier and an adder, the net execution latency is smaller for the multiplication instruction. When the multiplication result and "0" are added in the multiply-add instruction, the execution result is obtained without waiting for the execution result of the adder. Therefore, the net latency when the multiplication result and "0" are added is smaller than the net latency when the multiplication result and a value other than "0" are added. However, the instruction scheduler uses the longest latency in the execution unit to determine when to issue instructions.

Embodiments will be described below with reference to the drawings.

Figure 1:
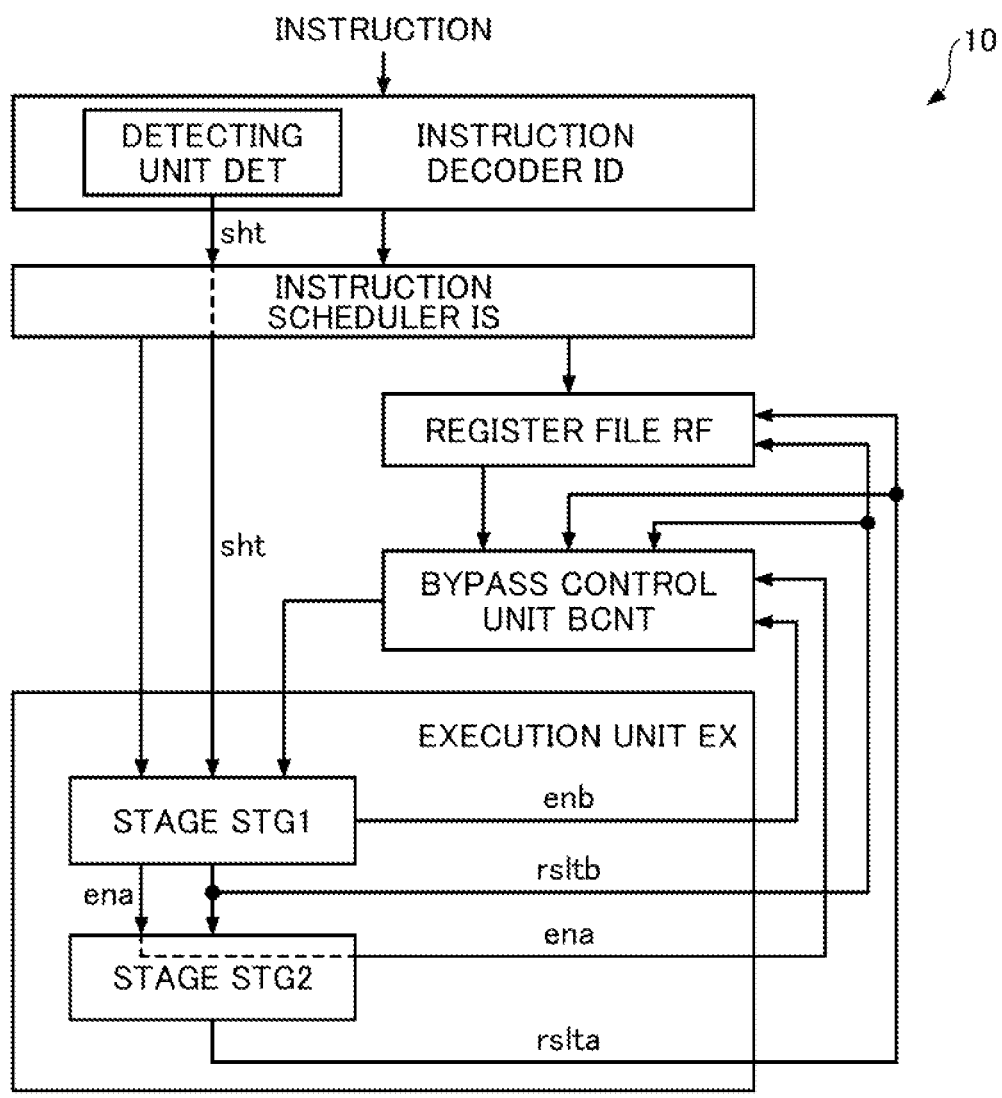
FIG. 1 is a block diagram illustrating an example of the main part of an instruction processing apparatus in one embodiment.

FIG. 1 illustrates an example of the main part of the instruction processing apparatus in one embodiment. An instruction processing apparatus 10 illustrated in FIG. 1 is a processor such as a CPU (Central Processing Unit), for example. The instruction processing apparatus 10 includes an instruction decoder ID, an instruction scheduler IS, a register file RF, a bypass control unit BCNT, and an execution unit EX. The instruction decoder ID includes a detecting unit DET. The execution unit EX includes multiple stages STG (STG1, STG2). The number of stages STG may be three or more. In the following, an example is described in which the execution unit EX includes a multiply-add circuit, but the execution unit EX may include other circuits.

The instruction decoder ID decodes an instruction received from an instruction buffer or the like, and outputs instruction information indicating the decoded instruction to the instruction scheduler IS. The detecting unit DET determines whether the execution result obtained by the execution unit of the decoded instruction is early termination that can be achieved without using all of the multiple stages STG, and outputs the determination result to the instruction scheduler IS as a shortened flag sht. For example, the instruction decoder ID resets the shortened flag sht if the decoded instruction is a multiply-add instruction, and sets the shortened flag sht if the decoded instruction is a multiplication instruction.

The instruction scheduler IS sequentially holds instruction information received from the instruction decoder ID and the shortened flag sht. Among the held instruction information, the instruction scheduler IS sequentially inputs the instruction information executable by the execution unit EX and the shortened flag sht to the execution unit EX, and sequentially outputs the register information included in the executable instruction information to the register file RF. In the following, the instruction information output by the instruction scheduler IS is also referred to simply as an instruction.

In this case, the instruction scheduler IS changes the issue timing of the subsequent dependent instruction that depends on the preceding instruction, depending on whether the execution result is early termination or not. For example, the instruction scheduler IS issues the subsequent dependent instruction so that the insertion timing of the subsequent dependent instruction into the execution unit EX matches the timing when the execution result of the preceding instruction is bypassed from the bypass control unit BCNT to the execution unit EX. Thus, even when the cycle in which the execution result of the preceding instruction is output from the execution unit EX changes according to the value of the shortened flag sht, the execution result of the preceding instruction can be bypassed to the execution unit EX according to the execution timing of the subsequent dependent instruction.

The register file RF includes a plurality of registers each capable of holding the data used for the instruction and the execution result. The register file RF extracts the data used for the instruction by the execution unit EX from the register indicated by the register information (source operand) from the instruction scheduler IS and outputs the data to the bypass control unit BCNT.

Further, the register file RF receives the execution result rslta of the instruction output from the final stage STG2 of the execution unit EX or the execution result rsltb of the instruction output from the intermediate stage STG1 of the execution unit EX. The register file RF stores the received execution result in a register indicated by register information (destination operand) received from the execution unit EX together with the execution result of the instruction.

When the bypass control unit BCNT receives an enable signal ena from the execution unit EX, the bypass control unit BCNT selects the execution result rslta output from the final stage STG2 and outputs the execution result rslta to the input (for example, the first stage STG) of the execution unit EX as the source operand. When the bypass control unit BCNT receives the enable signal enb from the execution unit EX, the bypass control unit BCNT selects the execution result rsltb output from the intermediate stage STG1 and outputs the execution result rsltb to the input of the execution unit EX as the source operand. When the bypass control unit BCNT receives neither the enable signal ena nor the enable signal enb from the execution unit EX, the bypass control unit BCNT selects the source operand output from the register file RF and outputs the source operand to the input of the execution unit EX.

The execution unit EX runs, in a pipeline, multiple stages STG connected in series to execute instructions received from the instruction scheduler IS. In the example illustrated in FIG. 1, the first stage STG1 (=intermediate stage STG) executes multiplication and the final stage STG2 executes addition. For example, the execution unit EX is a multiply-add unit. When executing a multiplication instruction, the execution unit EX can obtain an execution result by the first stage STG.

When the shortened flag sht is set, the intermediate stage STG1 outputs an enable signal enb to the bypass control unit BCNT together with the execution result rsltb. Thus, when the execution unit EX executes the multiplication instruction, the execution result rsltb can be bypassed one cycle earlier than when the execution result rslta is output from the final stage STG2.

Note that the intermediate stage STG1 does not output the enable signal ena when the shortened flag sht is set. The intermediate stage STG1 outputs the enable signal ena to the final stage STG together with the output of the execution result rsltb when the shortened flag sht is reset. When the final stage STG2 receives the enable signal ena, the final stage STG2 outputs the enable signal ena to the bypass control section BCNT together with the output of the execution result rslta.

As described above, in the present embodiment, the instruction processing apparatus 10 bypasses the execution result rsltb at the intermediate stage STG 1 when the detecting unit DET detects that the execution result obtained by the execution unit is early termination without using all of the multiple stages STG. Accordingly, the execution result rsltb can be bypassed earlier than when the execution result rslta is output from the final stage STG 2, and the processing performance of the instruction processing apparatus 10 can be improved.

Moreover, by providing the detecting unit DET in the instruction decoder ID, whether or not the execution result rsltb in the intermediate stage STG 1 can be bypassed (that is, early termination or not) can be determined at the time of decoding the instruction. The instruction scheduler IS changes the issue timing of the subsequent dependent instruction that depends on the preceding instruction depending on whether or not the execution result is early termination. Thus, even when the cycle in which the execution result of the preceding instruction is output from the execution unit EX changes according to the value of the shortened flag sht, the execution result of the preceding instruction can be bypassed to the execution unit EX according to the execution timing of the subsequent dependent instruction.

The detecting unit DET may be provided in the instruction scheduler IS. In this case, the instruction scheduler IS determines whether the execution result is early termination between the time of receiving the instruction from the instruction decoder ID and the time of outputting the received instruction to the execution unit EX, and sets or resets the shortened flag sht according to the determination result.

Figure 2:
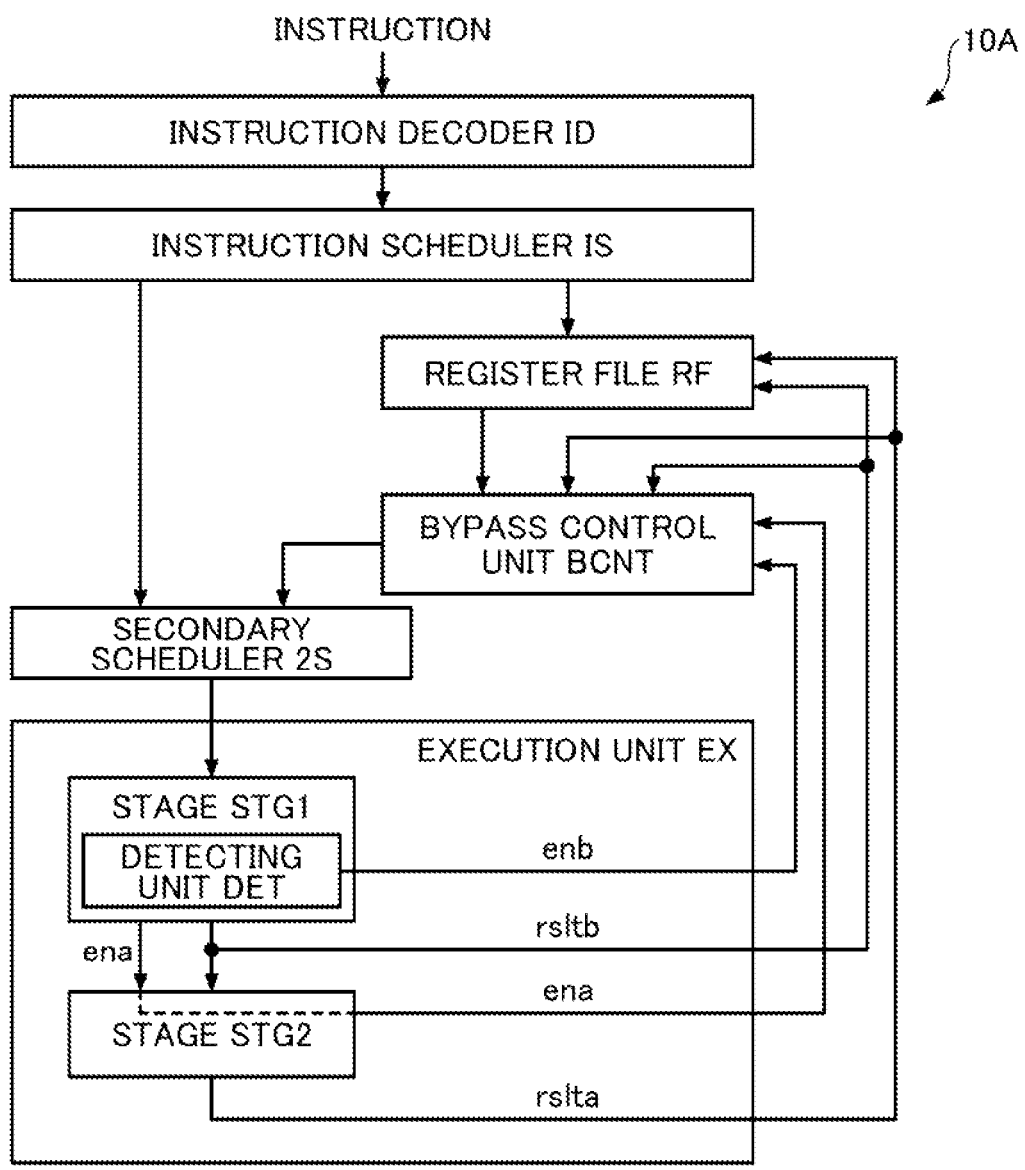
FIG. 2 is a block diagram illustrating an example of the main part of an instruction processing apparatus in another embodiment.

FIG. 2 illustrates an example of the main part of an instruction processing apparatus in another embodiment. Elements similar to those in FIG. 1 are denoted by the same symbols and detailed descriptions of those elements are omitted. An instruction processing apparatus 10A illustrated in FIG. 2 is, for example, a processor such as a CPU. The instruction processing apparatus 10A newly includes a secondary scheduler 2S, with respect to the instruction processing apparatus 10 in FIG. 1. The secondary scheduler 2S is arranged between the instruction scheduler IS and the execution unit EX. Moreover, the instruction processing apparatus 10A is provided with the detecting unit DET in the intermediate stage STG1 (the first stage in this example) instead of providing the detecting unit DET in the instruction decoder ID. The execution unit EX is, for example, a multiply-add unit that executes a multiply-add instruction ("a*b+c (* is a multiplication sign)").

The secondary scheduler 2S includes multiple entries that sequentially hold instructions issued from the instruction scheduler IS and source operands transferred from the bypass control unit BCNT. The secondary scheduler 2S has a function to delay the held instruction and source operand by a determined cycle, and issues the instruction held in the entry in which the source operand is determined, to the execution unit together with the source operand.

Thus, for example, when the execution result is bypassed from the final stage STG2, the output of the instruction received from the instruction scheduler IS to the execution unit EX can be made to wait until the source operand is received from the bypass control unit BCNT. That is, even when the cycle for outputting the execution result (rslta or rsltb) from the execution unit EX changes, the instruction from the instruction scheduler IS and the source operand from the bypass control unit BCNT can wait by the secondary scheduler 2S.

When the detecting unit DET provided in the intermediate stage STG1 detects that "c" of the multiply-add instruction ("a*b+c") is "0", the detecting unit DET resets the enable signal ena and sets the enable signal enb. When the detecting unit DET detects that "c" of the multiply-add instruction ("a*b+c") is not "0", the detecting unit DET sets the enable signal ena and resets the enable signal enb.

Thus, when "c" of the multiply-add instruction ("a*b+c") is "0", the execution result can be bypassed from the intermediate stage STG1. That is, the execution result rsltb can be bypassed one cycle earlier than when the execution result rslta is bypassed from the final stage STG.

For example, suppose that the execution unit EX has five stages STG and the detecting unit DET is provided in the second stage STG. In this case, the instruction scheduler IS may issue a subsequent dependent instruction so that the timing of the input of the subsequent dependent instruction to the execution unit EX is earlier than the timing when the execution result at the final stage STG of the preceding instruction is bypassed and input to the execution unit EX.

That is, the instruction scheduler IS may set the cycle from the issue of the preceding instruction to the issue of the subsequent dependent instruction to greater than or equal to two cycles but less than five cycles. In this case also, the secondary scheduler 2S can match the timing when the execution result of the preceding instruction and the subsequent dependent instruction are input to the execution unit EX.

As described above, the same effect as the above described embodiment can be obtained in the present embodiment. For example, when the early termination is detected by the detecting unit DET, the instruction processing apparatus 10A can bypass the execution result rsltb earlier than the execution result rslta by bypassing the execution result rsltb in the intermediate stage STG1.

In this case, the detecting unit DET provided in the intermediate stage STG1 can determine whether the execution result rsltb can be bypassed. Therefore, it can be determined whether the execution result rsltb can be bypassed according to the value of the source operand that cannot be determined by the instruction code. As a result, the execution result rsltb can be bypassed earlier than when the execution result rslta is output from the final stage STG2, and the processing performance of the instruction processing apparatus 10A can be improved.

The secondary scheduler 2S is provided, and, therefore, the instruction scheduler IS can vary the number of cycles from the issue of the preceding instruction to the issue of the subsequent dependent instruction. In this case also, the secondary scheduler 2S can match the timing when the execution result of the preceding instruction and the subsequent dependent instruction are input to the execution unit EX.

In addition to the detecting unit DET in FIG. 2, the instruction processing apparatus 10A may have a detecting unit DET provided in the instruction decoder ID as in FIG. 1. This makes it possible to determine whether the execution result rsltb can be bypassed both before and after the instruction is issued to the execution unit EX. As a result, the bypass frequency of the execution result rsltb can be improved compared with the case where the detecting unit DET is provided only at the intermediate stage STG, and the processing performance of the instruction processing apparatus 10A can be further improved.

Figure 3:
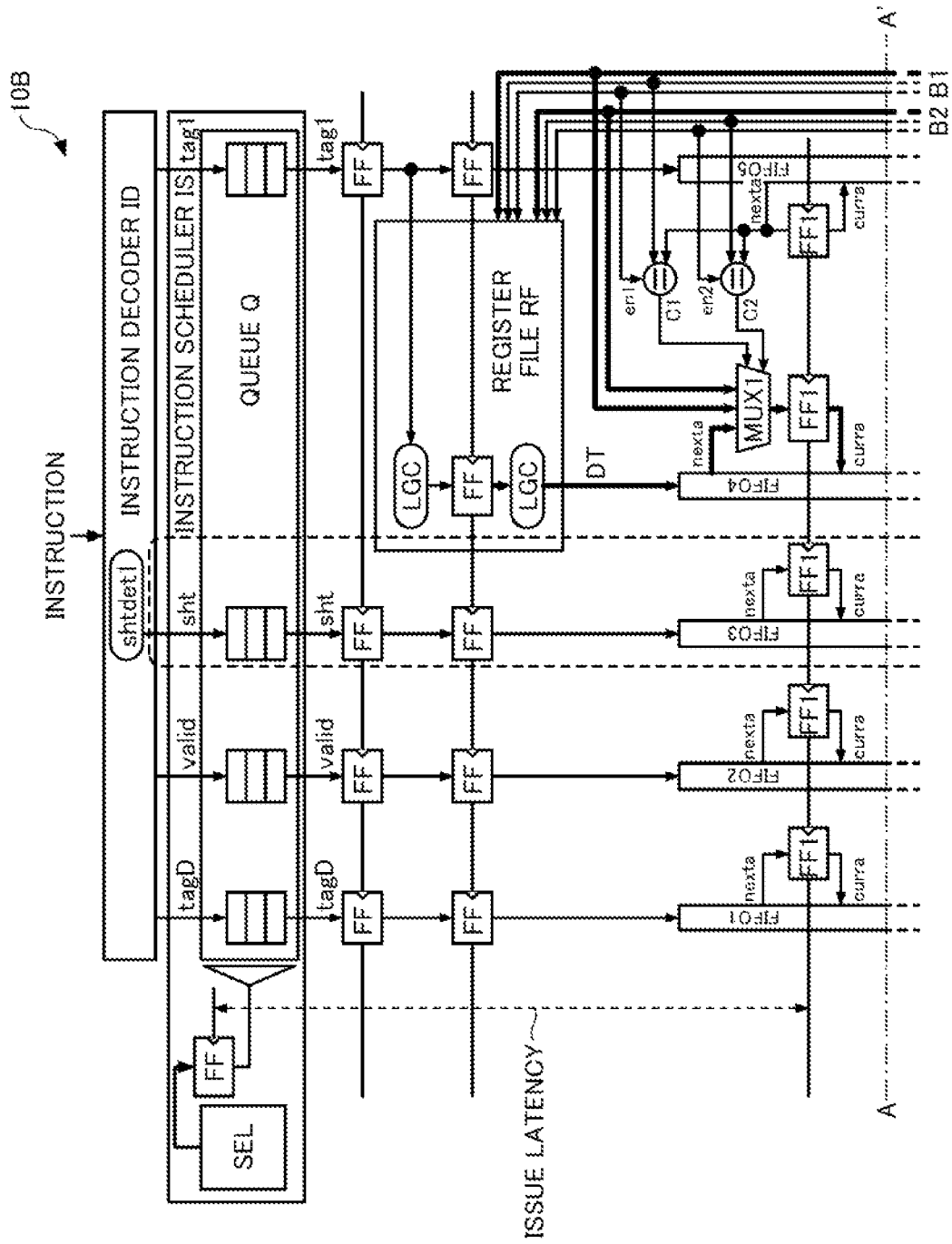
FIG. 3 is a block diagram illustrating an example of the main part of an instruction processing apparatus in yet another embodiment.
Figure 4:
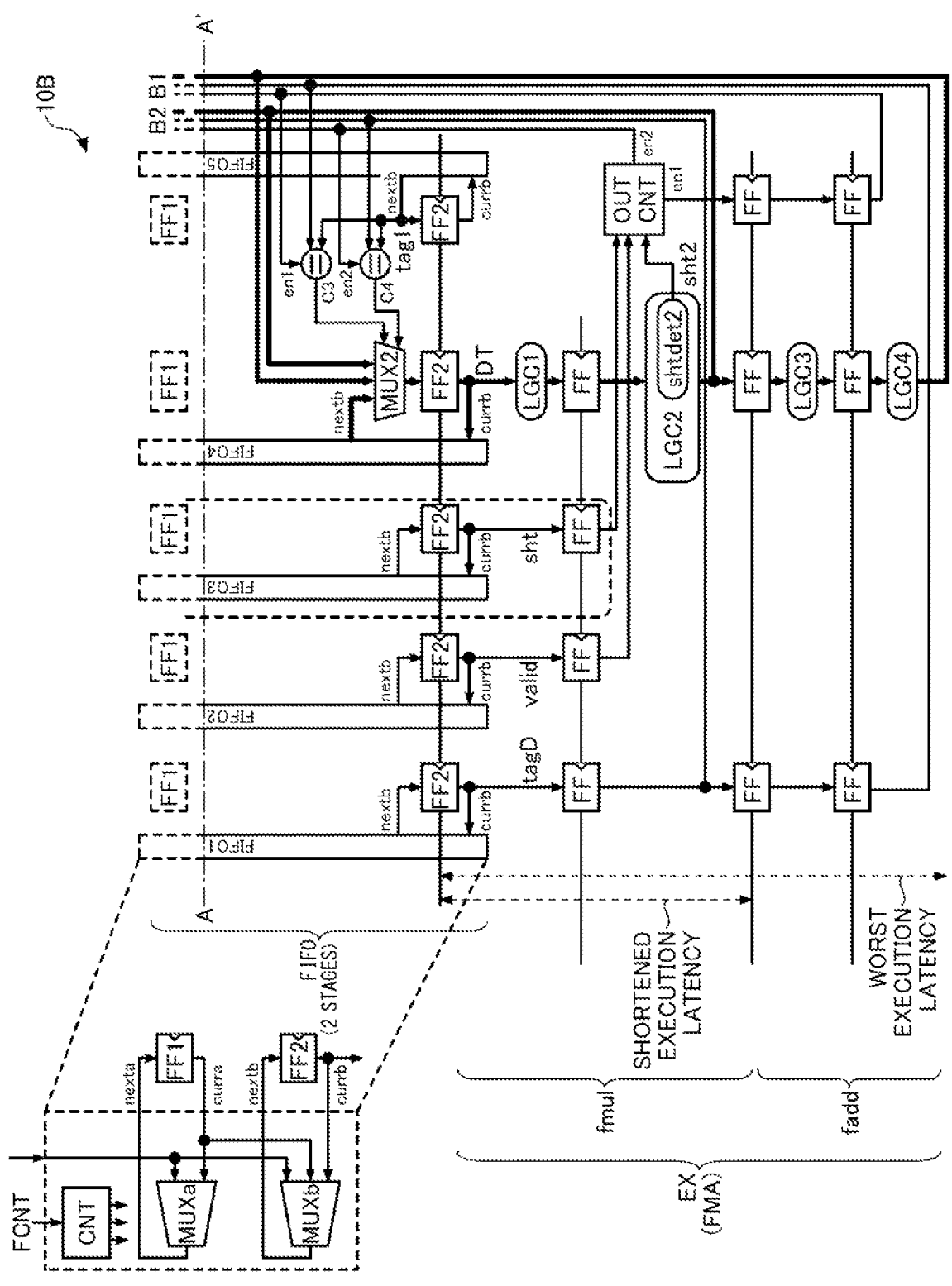
FIG. 4 is a block diagram illustrating the continuation of FIG. 3.

FIGS. 3 and 4 illustrate an example of the main part of the instruction processing apparatus in yet another embodiment. Elements similar to those in FIG. 1 are denoted by the same symbols and detailed descriptions of those elements are omitted. The circuit illustrated in FIG. 4 illustrates the continuation of the circuit illustrated in FIG. 3 and is connected to the circuit illustrated in FIG. 3 with the A-A' line as the boundary. An instruction processing apparatus 10B illustrated in FIG. 3 and FIG. 4 is, for example, a processor such as a CPU. For example, FIG. 3 illustrates a front-end side circuit including the instruction decoder ID and the instruction scheduler IS, and FIG. 4 illustrates a back-end side circuit including the execution unit EX. Signal lines indicated by thick lines indicate data lines of multiple bits.

The instruction processing apparatus 10B includes the instruction decoder ID, the instruction scheduler IS, the register file RF, comparators C1 and C2, a multiplexer MUX1, multiple FIFO (First-In First-Out) logic units, and multiple flip-flops FF. The multiple flip-flops FF operate in synchronization with a clock. Further, the instruction processing apparatus 10B includes comparators C3 and C4, a multiplexer MUX2, logic circuits LGC1 to LGC4 and an output control unit OUTCNT.

The logic circuits LGC1 to LGC4 are examples of execution units that execute instructions. In the following, the five FIFO logic units are referred to as FIFO1 to FIFO5. Each stage of the pipeline of the instruction processing apparatus 10B is separated by a flip-flop FF connected in series. Instruction information for executing instructions is then transferred to the next stage every clock cycle.

The instruction decoder ID decodes instructions received from an instruction buffer or the like, generates instruction information such as tags tagD, tagI, and valid flags, etc., and outputs the generated instruction information to the instruction scheduler IS. The tag tagD includes the number of the physical registers in which the destination operands that are the execution results are stored. The tag tagI includes the number of the physical registers in which the source operands that are the data used for the instruction are stored. The valid flag valid is set to "1" when the instruction information such as the tag tagD and tag tagI is valid. In order to simplify the explanation, the tags indicating the instruction code and the second and subsequent source operands are omitted.

The instruction decoder ID includes a shortened detecting unit shtdet1. When the execution result obtained by the execution unit of the decoded instruction detects early termination obtained without using all of the logic circuits LGC1 to LGC4, the shortened detecting unit shtdet1 sets the shortened flag sht to "1" and outputs the shortened flag sht to the instruction scheduler IS. When the shortened detecting unit shtdet1 detects that the execution result obtained according to the decoded instruction is obtained by using all of the logic circuits LGC1 to LGC4, the shortened detecting unit shtdet1 sets the shortened flag sht to "0" and outputs the shortened flag sht to the instruction scheduler IS. The shortened detecting unit shtdet1 is an example of a detecting unit that detects early termination based on the decoded instruction.

For example, when the execution unit EX is a multiply-add circuit that executes a multiply-add instruction or the like, the shortened detecting unit shtdet1 sets the shortened flag sht to "1" when the decoded instruction is a multiplication instruction. The dashed line frame illustrated in FIGS. 3 and 4 indicates the propagation path of the shortened flag sht generated by the instruction decoder ID to the execution unit EX and the circuit included in the propagation path.

The instruction scheduler IS includes an instruction selector SEL and a queue Q with multiple entries. The queue Q sequentially holds instruction information such as tags tagD, tagI, a valid flag valid, and a shortened flag sht, etc., received from the instruction decoder ID. The instruction selector SEL selects, among the multiple entries of the queue Q, an entry holding instruction information executable by the execution unit EX, and issues the selected instruction information as an instruction. The instruction scheduler IS makes it possible to output the instruction received in-order from the instruction decoder ID to the execution unit EX out-of-order, thereby enabling out-of-order execution of the instruction.

Here, the number of cycles until the instruction information selected by the instruction selector SEL of the instruction scheduler IS reaches the flip-flop FF1 of FIFO1 to FIFO5 is also referred to as the issue latency. Further, the number of cycles from the output of the instruction information from the flip-flop FF2 of FIFO1 to FIFO5 to the completion of the instruction by the execution unit EX is referred to as the execution latency. Each of the multiple flip-flops FF1 and the multiple flip-flops FF2 is an example of an entry that holds an instruction issued from the instruction scheduler IS and a source operand transferred from the register file RF and buses B1, B2.

The register file RF includes multiple registers that each hold data (source operand) used for an instruction and an execution result (destination operand). The register file RF outputs the data DT (source operand) held in the register indicated by the tag tagI to the execution unit EX via FIFO4.

Further, the register file RF receives, at the write port, the execution result (destination operand), the tag tagD, and the enable signals en1, en2 received from the execution unit EX via the bus B1 or the bus B2. The register file RF stores the execution result received at the write port in the register indicated by the tag tagD corresponding to the execution result.

Each of FIFO1 to FIFO5 has a two-stage configuration. As illustrated in FIG. 4, each of FIFO1 to FIFO5 has multiplexers MUXa and MUXb that control whether instruction information is to be delayed by each flip-flop FF1 and FF2, and a control unit CNT that controls the multiplexers MUXa and MUXb. The control unit CNT generates a selection signal that controls the selection of the multiplexers MUXa and MUXb according to the FIFO control signal FCNT generated in the instruction processing apparatus 10B.

The flip-flop FF1 receives instruction information nexta output from the multiplexer MUXa and outputs the instruction information nexta to the multiplexers MUXa and MUXb as instruction information curra. The flip-flop FF2 receives instruction information nextb output from the multiplexer MUXb and outputs the instruction information nextb to the multiplexer MUXb and the execution unit EX as instruction information currb.

By delaying the transfer cycle of instruction information transferred from the instruction scheduler IS to the execution unit EX, FIFO1 to FIFO5 can adjust the bypass timing of the execution result after the instruction scheduler IS issues the instruction. That is, FIFO1 to FIFO5 functions as a secondary scheduler that adjusts the bypass timing determined by the instruction scheduler IS.

By providing FIFO1 to FIFO5, it is possible to deter the occurrence of stalls or flushes even when unexpected events that could not be predicted by the instruction scheduler IS occur. The technique of adjusting bypass timing using FIFO1 to FIFO5 provided in the pipeline is referred to as OoS (Out-of-Step). Further, the pipeline including FIFO1 to FIFO5 is referred to as an OoS pipeline.

For example, the OoS pipeline is described in the research paper below.

Takeshi Katsu et al., "Out-of-Step Pipelines for Efficient Gathering/Scatter", Information Processing Society of Japan Technical Report, 2021 Mar. 18 <URL:https://ipsj.ixsq.nii.ac.jp/ej/?action=pages_view_main&active_action=repository_view_main_item_detail&item_id=210485&item_no=1&page_id=13&block_id=8>

Here, the number of cycles until the instruction information selected by the instruction selector SEL of the instruction scheduler IS reaches the flip-flop FF1 of FIFO1 to FIFO5, is also referred to as the issue latency. Further, the number of cycles from the output of the instruction information from the flip-flop FF2 of FIFO1 to FIFO5 to the completion of the instruction by the execution unit EX is also referred to as the execution latency.

There are two types of execution latencies: the worst execution latency when the execution result is output using all logic circuits LGC1 to LGC4 of the execution unit EX, and the shortened execution latency when the execution result is output using only logic circuits LGC1 and LGC2. In the example illustrated in FIG. 4, the worst execution latency is "4" and the shortened execution latency is "2".

The execution result at the time of bypassing with the worst execution latency is transferred by the bus B1, and the execution result at the time of bypassing with the shortened execution latency is transferred by the bus B2. Each of buses B1 and B2 includes a data line for transferring the execution result, a signal line for transferring the tag tagD, and a signal line for transferring an enable signal en (en1 or en2) indicating that the bypass is effective.

When adopting an OoS method in which the bypass timing is adjustable, the shortened execution latency may be greater than the minimum shortened execution latency as long as the shortened execution latency is less than the worst execution latency. When the instruction has dependency, the instruction scheduler IS issues a subsequent dependent instruction in accordance with the timing when the execution result of the preceding dependent instruction is bypassed with the shortened execution latency.

In FIG. 4, the logic circuits LGC1 to LGC4, which are instruction units, function as the execution unit EX of a floating-point multiply-add circuit FMA (Fused Multiply-Add). Below, the floating-point multiply-add circuit FMA is also simply referred to as FMA. For example, the function of the floating-point multiplier fmul is implemented by logic circuits LGC1 and LGC2, and the function of the floating-point adder fadd is implemented by logic circuits LGC3 and LGC4.

Therefore, when the instruction decoder ID decodes a floating-point multiplication instruction, the data output by the logic circuit LGC2 of the multiplier fmul becomes the execution result. When the floating-point multiplication instruction is decoded, the instruction decoder ID detects early termination and adds a shortened flag sht of "1" to bypass the multiplication result from the output of the logic circuit LGC2 through the bus B2.

On the other hand, when the instruction decoder ID decodes a floating-point multiply-add instruction, the data output by the adder fadd becomes the execution result. When the instruction decoder ID decodes a floating-point addition instruction, the data output by the adder fadd becomes the execution result. In these cases, the instruction decoder ID does not detect early termination and adds a shortened flag sht of "0" to bypass the addition result from the output of logic circuit LGC4 via the bus B1.

The logic circuit LGC2 of logic circuits LGC1 and LGC2 executing the addition instruction includes a shortened detecting unit shtdet2. When the shortened detecting unit shtdet2 detects that "c" of the floating-point multiply-add instruction indicated by "a*b+c (* is the multiplication sign)" is "0", the shortened detecting unit shtdet2 detects early termination and outputs a shortened detection signal sht2 set to "1" to the output control unit OUTCNT.

The shortened detecting unit shtdet2 is an example of a detecting unit that detects early termination based on the execution result in the intermediate stage of the execution unit EX. The shortened detecting unit shtdet2 may detect early termination and output the shortened detection signal sht2 set to "1" to the output control unit OUTCNT even when the instructions executed by the logic circuits LGC1 and LGC2 are floating-point multiplication instructions.

Depending on the data generated inside the execution unit EX, the shortened detecting unit shtdet2 can determine whether to bypass the execution result with the shortened execution latency or the worst execution latency. That is, even if the appropriate execution latency is not determined when the instruction is issued, the appropriate execution latency can be set after the instruction is issued. For simplicity of explanation, in FIGS. 3 and 4, the execution unit of the instruction of interest (FMA in FIG. 4) and the circuit elements related to the execution unit are illustrated.

The instruction processing apparatus 10B may have other execution units EX including an integer ALU (Arithmetic Logic Unit), etc. In this case, the shortened detecting unit shtdet1 is provided in common to the multiple execution units EX, and the shortened detecting unit shtdet2 is provided for each execution unit EX.

When the output control unit OUTCNT receives the valid flag valid of "1" and the shortened flag sht of "1", the output control unit OUTCNT outputs the enable signal en1 of "0" and the enable signal en2 of "1". When the output control unit OUTCNT receives the valid flag valid of "1" and the shortened flag sht2 of "1", the output control unit OUTCNT outputs the enable signal en1 of "0" and the enable signal en2 of "1". When the output control unit OUTCNT receives the valid flag valid of "1" and the shortened flags sht and sht2 of "0", the output control unit OUTCNT outputs the enable signal en1 of "1" and the enable signal en2 of "0".

The enable signal en2 is transferred to the comparators C2 and C4 and the register file RF via the bus B2. The enable signal en1 is transferred to the comparators C1 and C3 and the register file RF via the flip-flop FF provided in the adder fadd and the bus B1.

When the enable signal en1 of "1" is received, and the tag tagD from bus B1 and the tag tag1 (nexta) from the FIFO5 are matched, the comparator C1 outputs a signal that causes the multiplexer MUX1 to select the execution result from the bus B1. When the enable signal en2 of "1" is received, and the tag tagD from the bus B2 and the tag tag1 (nexta) from the FIFO5 are matched, the comparator C2 outputs a signal that causes the multiplexer MUX1 to select the execution result from bus B2.

When the multiplexer MUX1 receives the selection signal from the comparator C1, the multiplexer MUX1 selects the execution result from the bus B1 and outputs the execution result to the flip-flop FF1. When the multiplexer MUX1 receives the selection signal from the comparator C2, the multiplexer MUX1 selects the execution result from the bus B2 and outputs the execution result to the flip-flop FF1. When the multiplexer MUX1 does not receive a selection signal from any of the comparators C1 and C2, the multiplexer MUX1 selects the data nexta (i.e., data DT from the register file RF) from the FIFO4 and outputs the data nexta to the flip-flop FF1.

When the comparator C3 receives the enable signal en1 of "1", and the tag tagD from the bus B1 matches the tag tag1 (nextb) from the FIFO5, the comparator C3 outputs a signal that causes the multiplexer MUX2 to select the execution result from the bus B1. When the comparator C4 receives the enable signal en2 of "1", and the tag tagD from the bus B2 matches the tag tag1 (nextb) from the FIFO5, the comparator C4 outputs a signal that causes the multiplexer MUX2 to select the execution result from the bus B2.

The output control circuit OUTCNT and the comparators C1 to C4 are examples of the bypass control units that bypass the execution result in the intermediate stage to the input of the execution unit EX, when one or both of the shortened detecting units shtdet1 and shtdet2 detect early termination. In the present embodiment, when one or both of the shortened detecting units shtdet1 and shtdet2 detect early termination, the output control circuit OUTCNT controls the comparators C1 to C4 to bypass the multiplication result of the floating-point multiplier fmul.

When the multiplexer MUX2 receives the selection signal from the comparator C3, the multiplexer MUX2 selects the execution result from the bus B1 and outputs the execution result to the flip-flop FF2. When the multiplexer MUX2 receives the selection signal from the comparator C4, the multiplexer MUX2 selects the execution result from the bus B2 and outputs the execution result to the flip-flop FF2. When the multiplexer MUX2 does not receive a selection signal from any of the comparators C3 and C4, the multiplexer MUX2 selects the data nextb (i.e., the data DT from the register file RF) from the FIFO4 and outputs the data nextb to the flip-flop FF2.

Note that the shortened detecting unit shtdet1 of the instruction decoder ID need not be provided. In this case, the queue Q for holding the shortened flag sht indicated by the dashed line frame and the flip-flop FF and the FIFO3 for transferring the shortened flag sht are not provided. Further, the output control unit OUTCNT controls the bypass with the shortened execution latency based only on the detection result obtained by the shortened detecting unit shtdet2.

The instruction processing apparatus 10B may be a SIMD processor capable of executing SIMD instructions. In this case, the instruction processing apparatus 10B has multiple execution units EX capable of executing one instruction in parallel by using different data from each other. The register file RF has multiple registers holding data used by the multiple execution units EX.

The shortened detecting unit shtdet1 mounted on the SIMD processor is commonly provided in the multiple execution units EX and detects early termination based on instructions for each execution unit. The shortened detecting unit shtdet2 is provided for each execution unit EX and detects early termination for each execution unit EX. Further, multiple sets of comparators C1 and C2, multiple multiplexers MUX1, multiple sets of comparators C3 and C4, multiple multiplexers MUX2, and the output control unit OUTCNT are provided corresponding to each of the multiple execution units EX.

Figure 5:
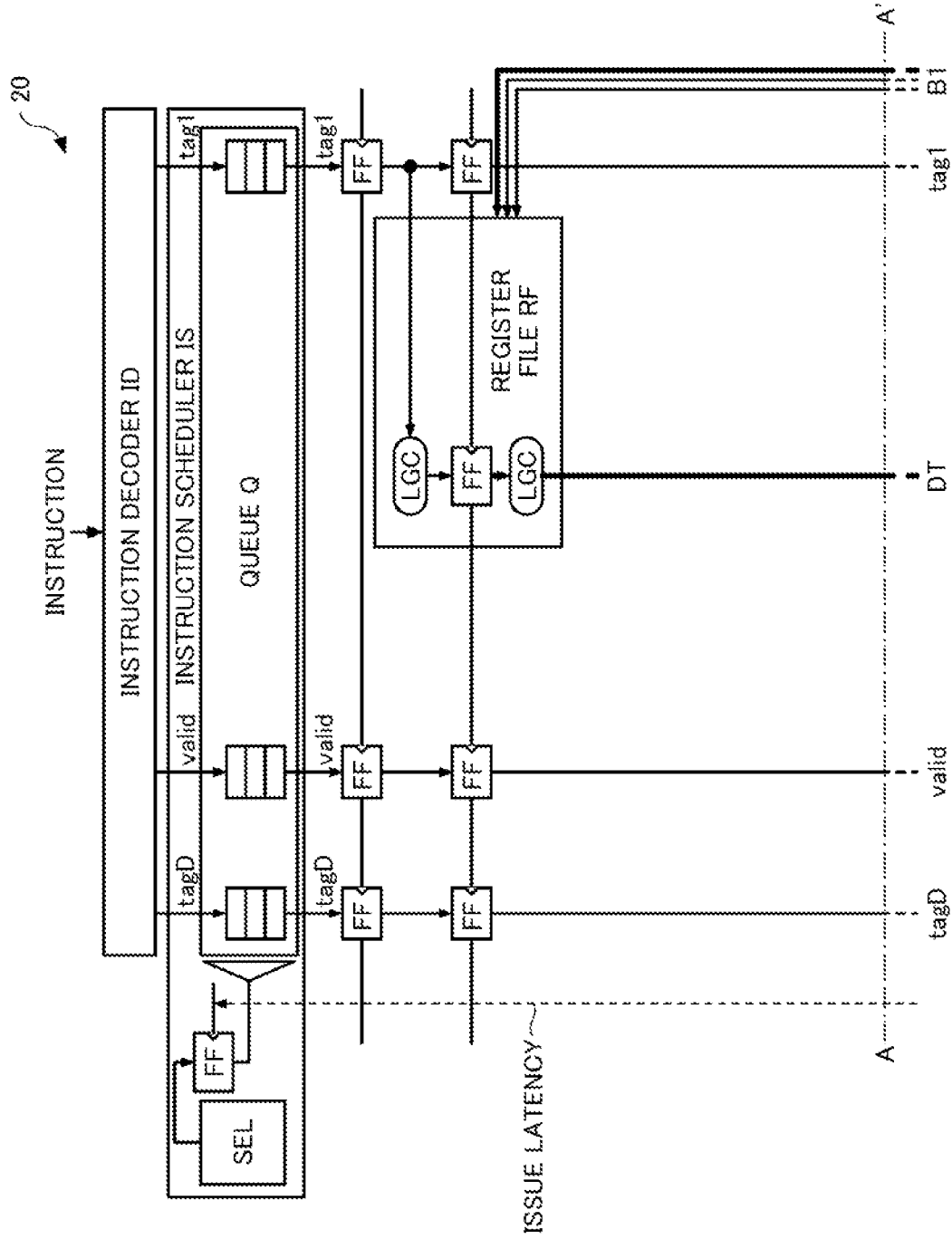
FIG. 5 is a block diagram illustrating an example of the main part of another instruction processing apparatus.
Figure 6:
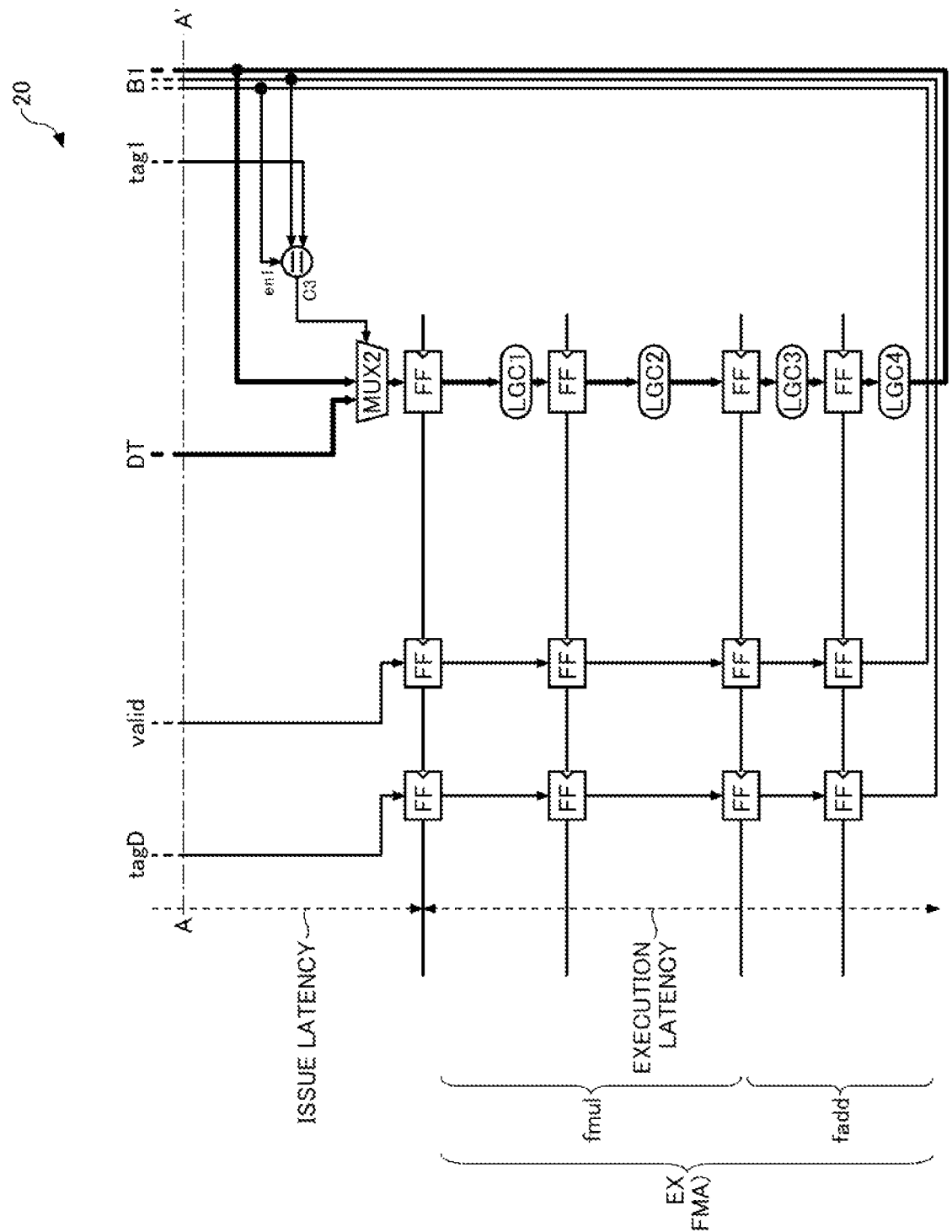
FIG. 6 is a block diagram illustrating the continuation of FIG. 5.

FIG. 5 and FIG. 6 illustrate an example of the main parts of another instruction processing apparatus. Elements similar to those in FIG. 3 and FIG. 4 are denoted by the same symbols and detailed descriptions of those elements are omitted. An instruction processing apparatus 20 illustrated in FIG. 5 and FIG. 6 has a similar configuration to the configuration in which circuits related to FIFO 1 to FIFO5 and shortened flags sht and sht2 are removed from the instruction processing apparatus 10B illustrated in FIG. 3 and FIG. 4.

The execution latency of the FMA mounted on the instruction processing apparatus 20 is fixed to "4" corresponding to the logic circuits LGC1 to LGC4, and the shortened execution latency does not exist. The bypass path of the execution result output from the execution unit EX is only the bus B1 connected to the output of the logic circuit LGC4. Further, the instruction processing apparatus 20 does not employ an OoS technique using FIFO1 to FIFO5, and, therefore, the bypass of the execution result is performed at only one location by the multiplexer MUX2.

Figure 7:
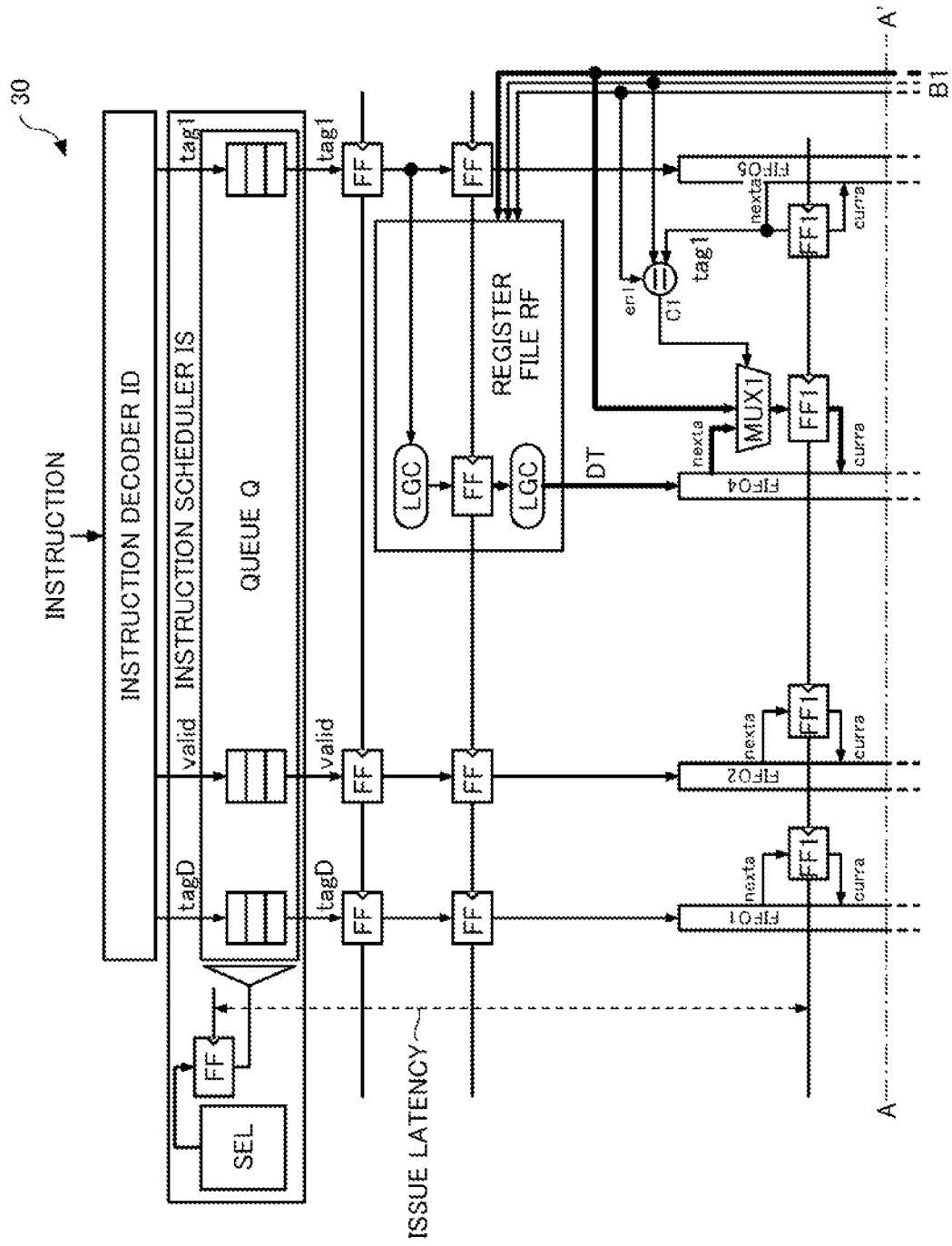
FIG. 7 is a block diagram illustrating an example of the main part of yet another instruction processing apparatus.
Figure 8:
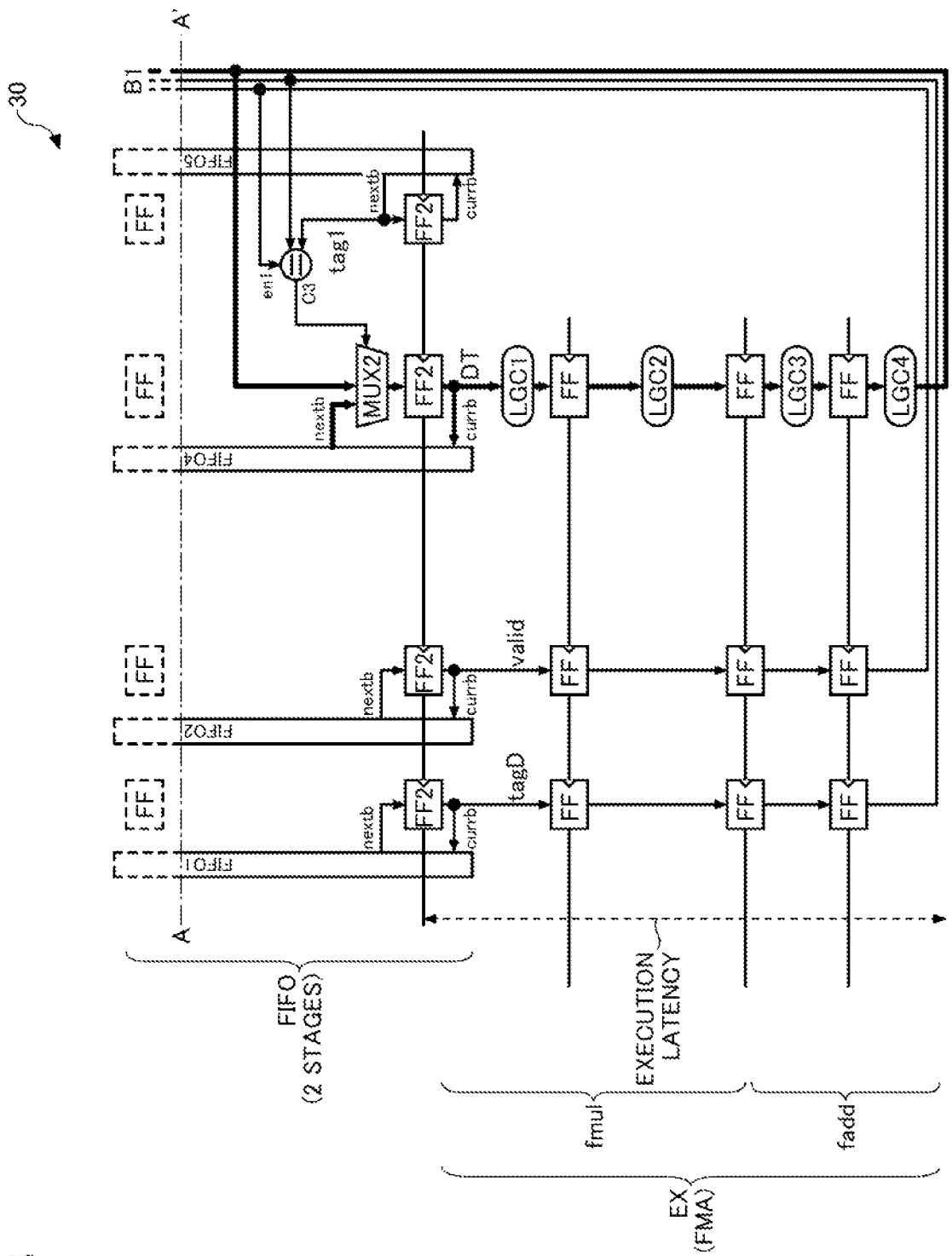
FIG. 8 is a block diagram illustrating the continuation of FIG. 7.

FIGS. 7 and 8 illustrate an example of the main part of yet another instruction processing apparatus. Elements similar to those in FIGS. 3 and 4 are denoted by the same symbols and detailed descriptions of those elements are omitted. An instruction processing apparatus 30 illustrated in FIGS. 7 and 8 has a similar configuration to the configuration in which circuits related to the shortened flags sht and sht2 are removed from the instruction processing apparatus 10B illustrated in FIGS. 3 and 4.

Similar to the instruction processing apparatus 20 illustrated in FIGS. 5 and 6, the execution latency of the FMA mounted on the instruction processing apparatus 30 is fixed to "4" corresponding to the logic circuits LGC1 to LGC4, and the shortened execution latency does not exist. The bypass path of the execution result output from the execution unit EX is only the bus B1 connected to the output of the logic circuit LGC4. However, the instruction processing apparatus 30 adopts the OoS method using FIFO1 to FIFO5 (except FIFO3), and, therefore, the bypass of the execution result can be performed at two locations by the multiplexers MUX1 and MUX2.

Figure 9:
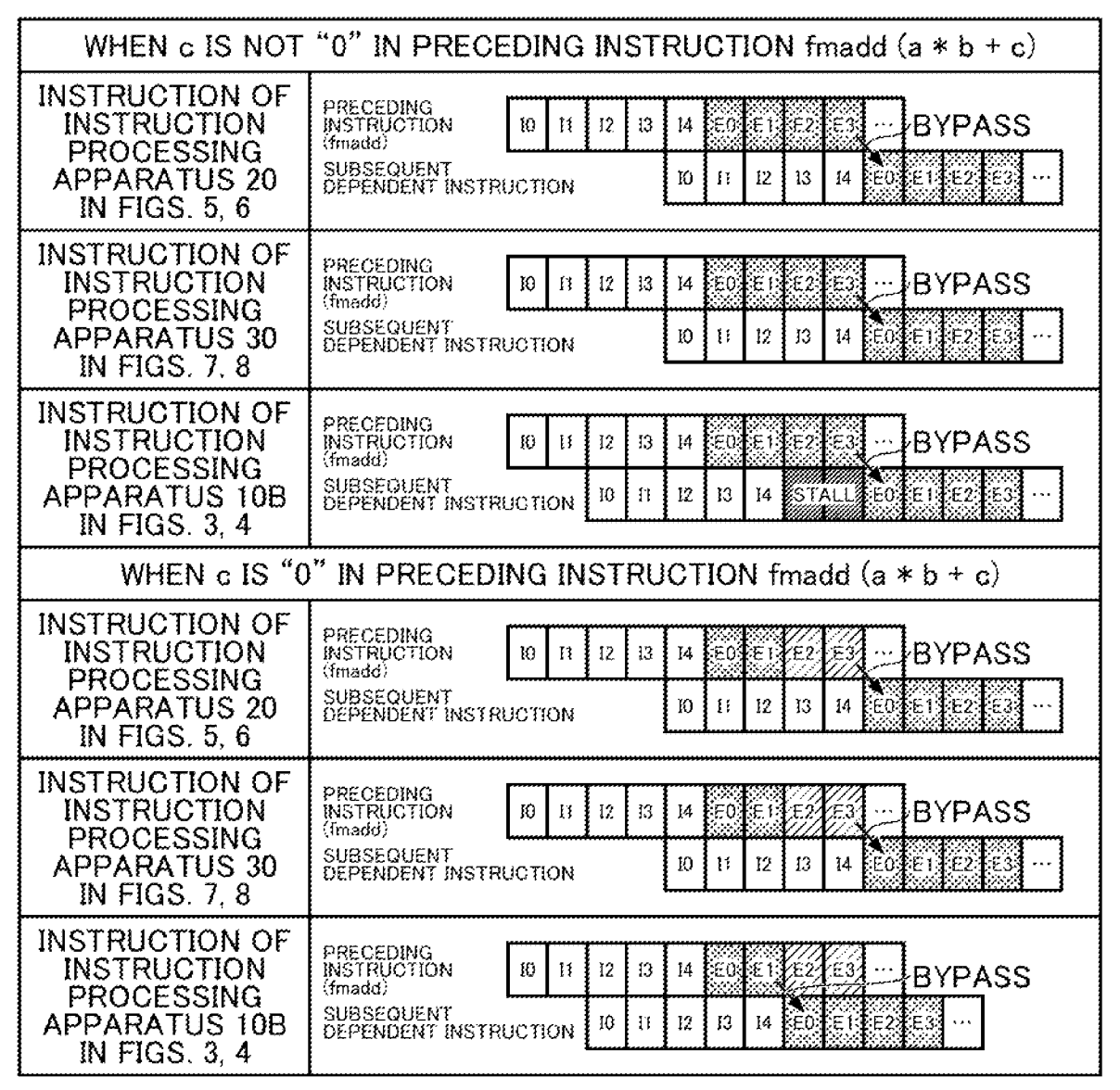

FIG. 9 illustrates an example of a pipeline instruction when executing a floating-point multiply-add instruction. In the example illustrated in FIG. 9, a preceding floating-point multiply-add instruction fmadd and a subsequent dependent instruction that has a dependency relationship with this floating-point multiply-add instruction fmadd are executed sequentially. A rectangle in the figure indicates a cycle (that is, a stage). The symbols I0 to I4 indicate the issuing stage of the instruction, and the symbols E0 to E3 indicate the execution stage of the instruction. The execution stages E0 and E1 of the preceding instruction indicate the execution cycle of the multiplication instruction by the floating-point multiplier fmul. The execution stages E2 and E3 of the preceding instruction indicate the execution cycle of the addition instruction by the floating-point adder fadd.

The instruction scheduler IS of the instruction processing apparatuses 20 and 30 issues the preceding instruction (fmadd) and then issues the subsequent dependent instruction after the execution latency (="4") of the floating-point multiply-add instruction fmadd. The instruction scheduler IS of the instruction processing apparatus 10B issues the preceding instruction (fmadd) and then issues the subsequent dependent instruction after the shortened execution latency (="2") of the floating-point multiply-add instruction fmadd.

If "c" of the preceding instruction fmadd (a*b+c) is not "0", the execution result is obtained by the execution stage E3. In the instruction processing apparatuses 20 and 30, the execution result obtained by the execution stage E3 of the preceding instruction is bypassed to the execution stage E0 of the subsequent dependent instruction in the next cycle after the execution stage E3 of the preceding instruction. In the instruction processing apparatus 10B, the execution result of the preceding instruction is not obtained in the next cycle after the issue stage I4 of the subsequent dependent instruction. Therefore, the subsequent dependent instruction is stalled for two cycles by the secondary scheduler by FIFO1 to FIFO5.

Then, the execution result by the execution stage E3 of the preceding instruction is bypassed to the execution stage E0 of the subsequent dependent instruction in the next cycle after the execution stage E3 of the preceding instruction. Therefore, the execution stage E3 of the subsequent dependent instruction can receive the bypassed execution result even when the subsequent dependent instruction is issued at the timing when the execution result of the preceding dependent instruction is bypassed with the shortened execution latency. As a result, the malfunction of the instruction processing apparatus 10B can be prevented.

When "c" of the preceding instruction fmadd (a*b+c) is "0", the execution result is obtained by the execution stage E1. In the instruction processing apparatuses 20 and 30, the execution result of the preceding instruction is bypassed to the execution stage E0 of the subsequent dependent instruction in the next cycle after the execution stage E3 of the preceding instruction. In contrast, in the instruction processing apparatus 10B, the execution result of the preceding instruction can be bypassed to the execution stage E0 of the subsequent dependent instruction in the next cycle after the execution stage E1 of the preceding instruction. Thus, the instruction processing apparatus 10B can output the execution result of the subsequent dependent instruction two cycles earlier than the instruction processing apparatuses 20 and 30, and the processing efficiency of the instruction can be improved.

FIG. 10 illustrates an example of a pipeline instruction from another perspective when executing a floating-point multiply-add instruction. A detailed description of the same instruction as that in FIG. 9 is omitted. In FIG. 10, as in FIG. 9, a preceding floating-point multiply-add instruction fmadd and a subsequent dependent instruction that has a dependency relationship with this floating-point multiply-add instruction fmadd are executed sequentially.

However, in FIG. 10, the issue stages are two stages I0 and I1, and the execution stage of the subsequent dependent instruction is one stage E0. The execution stages E0 and E1 of the preceding instruction indicate the execution cycle of the multiplication instruction by the floating-point multiplier fmul. The execution stages E2 and E3 of the preceding instruction indicate the execution cycle of the addition instruction by the floating-point adder fadd.

In the case of always operating with the worst execution latency, when the "c" of the preceding instruction fmadd (a*b+c) is "0", the execution result of the preceding instruction is bypassed after the execution cycles E2 and E3 of the addition instruction, which causes a useless wait time for the subsequent dependent instruction.

On the other hand, in the case of always operating with the shortened execution latency, when the "c" of the preceding instruction fmadd (a*b+c) is not "0", the subsequent dependent instruction acquires the source operand before the completion of the execution of the preceding instruction. This causes the subsequent dependent instruction to be canceled and reissued. Canceling and reissuing the subsequent dependent instruction significantly reduces the processing performance of the instruction, so a technique that always operates with a shortened execution latency is not preferable.

On the other hand, in the instruction processing apparatus 10B illustrated in FIGS. 3 and 4, even when an instruction is issued with a shortened latency, the waiting for the bypass can be delayed by stalling in FIFO1 to FIFO5. As a result, even when "c" of the preceding instruction fmadd (a*b+c) is not "0", the cancellation and reissue of the subsequent dependent instruction can be prevented. Further, in the instruction processing apparatus 10B, if "c" of the preceding instruction fmadd (a*b+c) is not "0", the execution result of the preceding instruction can be bypassed with the shortened latency.

As described above, the same effect as the above described embodiment can be obtained in the present embodiment. For example, according to the instruction issued to the execution unit EX, the shortened detecting unit shtdet1 can determine whether to bypass the execution result with the shortened execution latency or the worst execution latency. According to the data generated inside the execution unit EX, the shortened detecting unit shtdet2 can determine whether to bypass the execution result with the shortened execution latency or the worst execution latency. Thus, when the execution result can be output with the shortened execution latency, the execution result can be bypassed with the shortened execution latency.

For example, when the multiplication instruction is executed with the FMA, the execution result can be bypassed with the shortened execution latency. Further, when the multiply-add instruction (a*b+c) is executed with the FMA, and when "c" is "0", the execution result can be bypassed with the shortened execution latency. As a result, the processing performance of the instruction processing apparatus 10B can be improved compared with the case where the instruction is not bypassed with the shortened execution latency.

Furthermore, in the present embodiment, shortened detecting units shtdet1 and shtdet2 are provided in the instruction decoder ID and the logic circuit LGC2, respectively. With this, it can be determined whether the execution result rsltb can be bypassed by both the instruction and the source operand. As a result, the bypass frequency of the execution result in the shortened execution latency can be improved, and the processing performance of the instruction processing apparatus 10B can be further improved.

Figure 11:
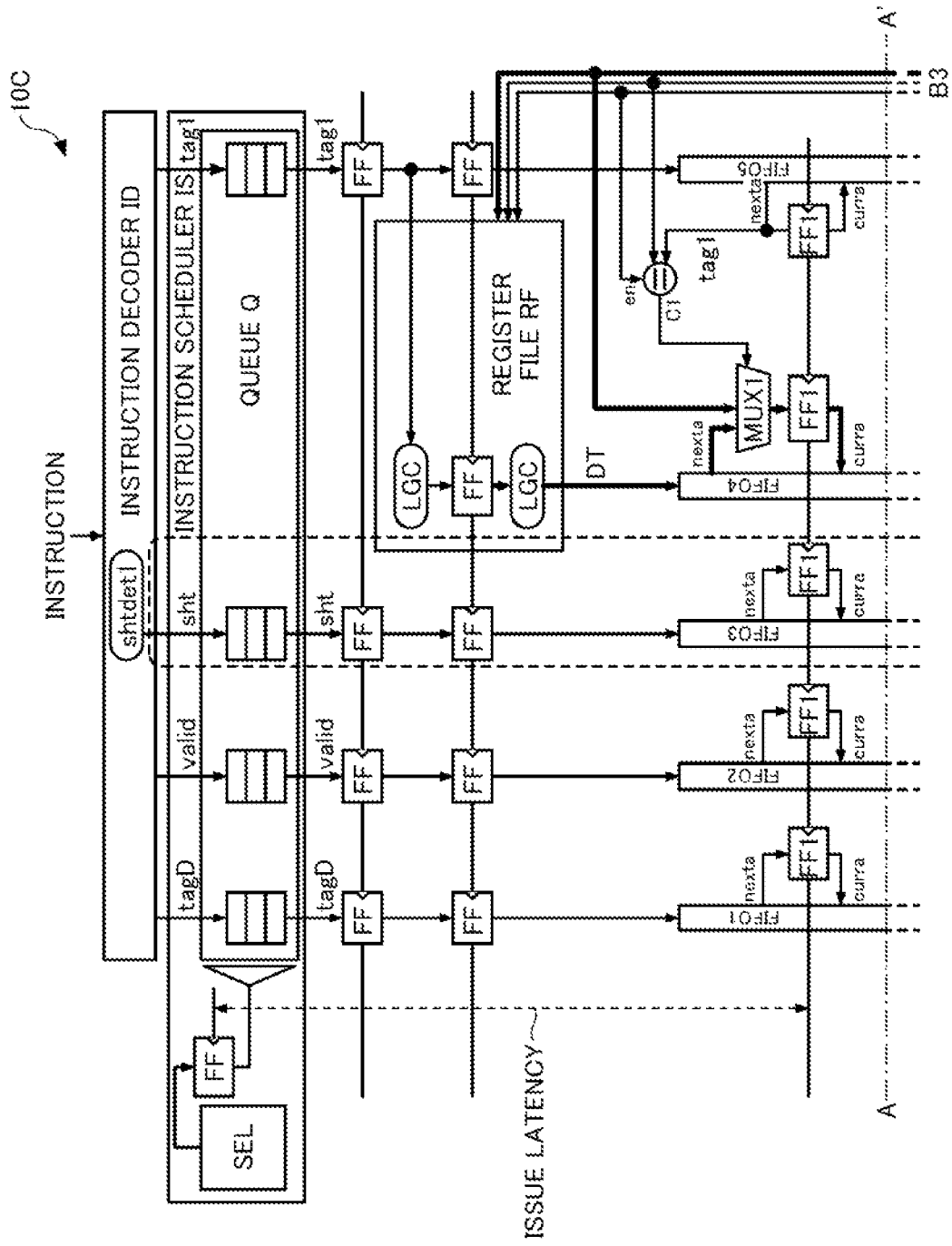
FIG. 11 is a block diagram illustrating an example of the main part of an instruction processing apparatus in another embodiment.
Figure 12:
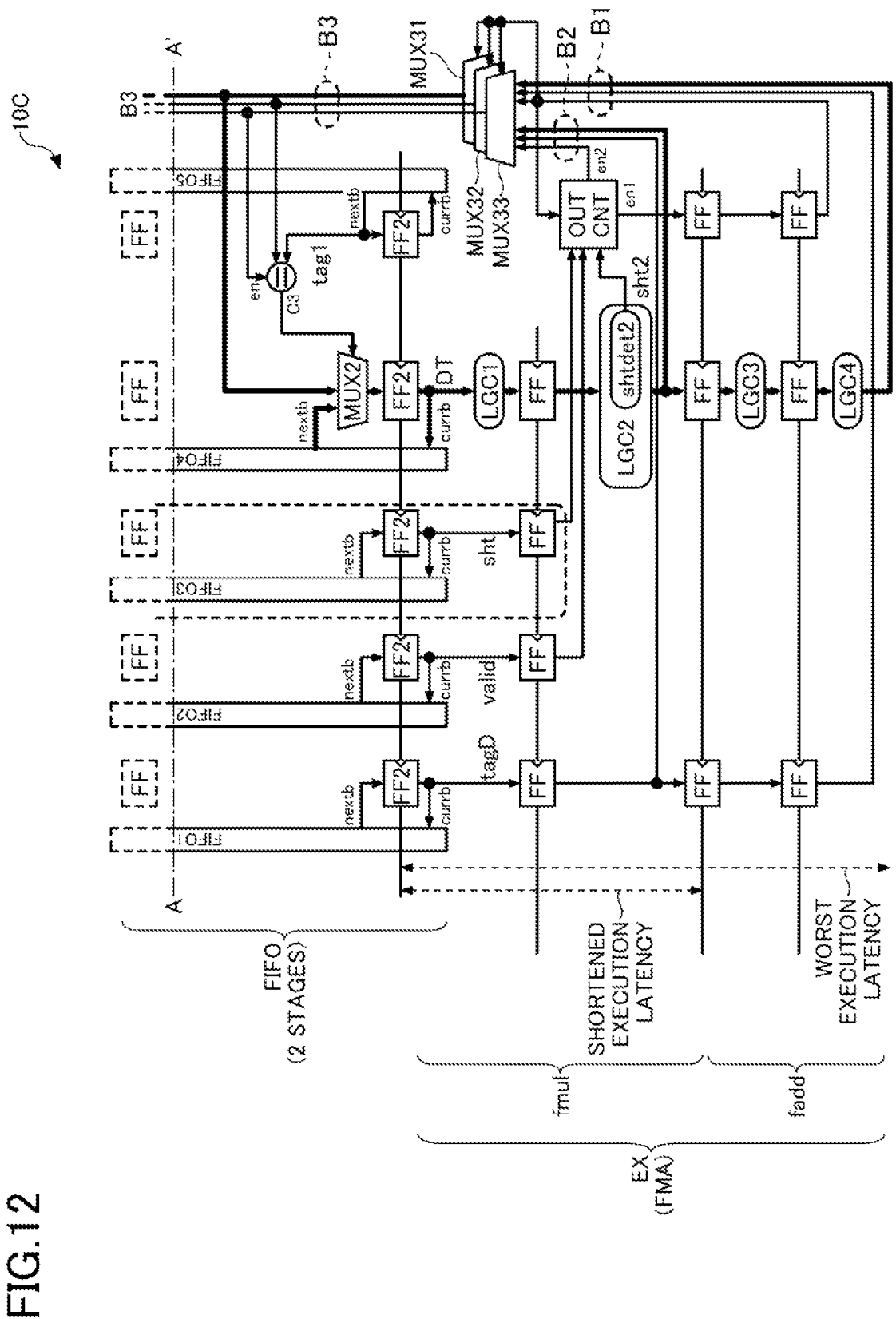
FIG. 12 is a block diagram illustrating the continuation of FIG. 11.

FIGS. 11 and 12 illustrate an example of the main part of the instruction processing apparatus in another embodiment. Elements similar to those in FIGS. 3 and 4 are denoted by the same symbols and detailed descriptions of those elements are omitted. An instruction processing apparatus 10C illustrated in FIGS. 11 and 12 is, for example, a processor such as a CPU.

The instruction processing apparatus 10C has a configuration similar to that of the instruction processing apparatus 10B illustrated in FIGS. 3 and 4, except that the instruction processing apparatus 10C includes three multiplexers MUX3 (MUX31, MUX32, MUX33 (FIG. 12)) that integrate the buses B1 and B2 illustrated in FIG. 12 to the bus B3. When the shortened detecting unit shtdet1 or the shortened detecting unit shtdet2 detects early termination of the instruction by the execution unit EX, each multiplexer MUX3 selects the execution result in the logic circuit LGC2, which is in the intermediate stage. Then, each multiplexer MUX3 transfers the selected execution result to the input of the execution unit EX and the register file RF. Each multiplexer MUX3 is an example of a selection unit that selects the execution result of the intermediate stage or the execution result of the final stage and outputs the execution result to the input of the execution unit.

For example, the multiplexer MUX 31 outputs the execution result to be transferred to the bus B1, to the bus B3, when the enable signal en1 is "1", and outputs the execution result to be transferred to the bus B2, to the bus B3, when the enable signal en1 is "0". The multiplexer MUX 32 outputs the tag tagD to be transferred to the bus B1, to the bus B3, when the enable signal en1 is "1", and outputs the tag tagD to be transferred to the bus B2, to the bus B3, when enable signal en1 is "0".

The multiplexer MUX 33 outputs the enable signal en1 to be transferred to the bus B1, as the enable signal en to bus B3, when enable signal en1 is "1". Further, the multiplexer MUX 33 outputs the enable signal en2 to be transferred to the bus B2, as the enable signal en to the bus B3, when the enable signal en1 is "0".

When both enable signals en1 and en2 are 1, each multiplexer MUX3 transfers data and information to be transferred to the bus B1, to the bus B3. That is, when both enable signals en1 and en2 are 1, the bypass instruction by the worst execution latency takes priority.

The comparators C1 and C3 are the same as the comparators C1 and C3 in FIGS. 3 and 4 except that the comparators C1 and C3 here receive the enable signal en instead of the enable signal en1. When the multiplexer MUX1 receives a selection signal from the comparator C1, the multiplexer MUX1 selects the execution result from the bus B3. When the multiplexer MUX1 does not receive a selection signal from the comparator C1, the multiplexer MUX1 selects the data nexta (i.e., the data DT from the register file RF) from the FIFO4.

When the multiplexer MUX2 receives a selection signal from the comparator C3, the multiplexer MUX2 selects the execution result from the bus B3. When the multiplexer MUX2 does not receive a selection signal from comparator C3, the multiplexer MUX2 selects data nextb (i.e., data DT from register file RF) from the FIFO4.

As described above, the same effect as the above described embodiment can be achieved in the present embodiment. For example, the shortened detecting units shtdet1 and shtdet2 can determine whether to bypass with the shortened execution latency or with the worst execution latency. Thus, when the execution result can be output with the shortened execution latency, the execution result can be bypassed with the shortened execution latency. As a result, the processing performance of the instruction processing apparatus 10C can be improved compared with the case where the execution result is not bypassed with the shortened execution latency.

Furthermore, in the present embodiment, by providing the multiplexer MUX3, the buses B1 and B2 can be integrated to the bus B3, and the wiring area can be made smaller compared with those in FIGS. 3 and 4. Further, the comparators C2 and C4 can be deleted from FIGS. 3 and 4, and the number of write ports in the register file RF can be reduced. As a result, the circuit scale of the instruction processing apparatus 10C can be made smaller than that of the instruction processing apparatus 10B.

Figure 13:
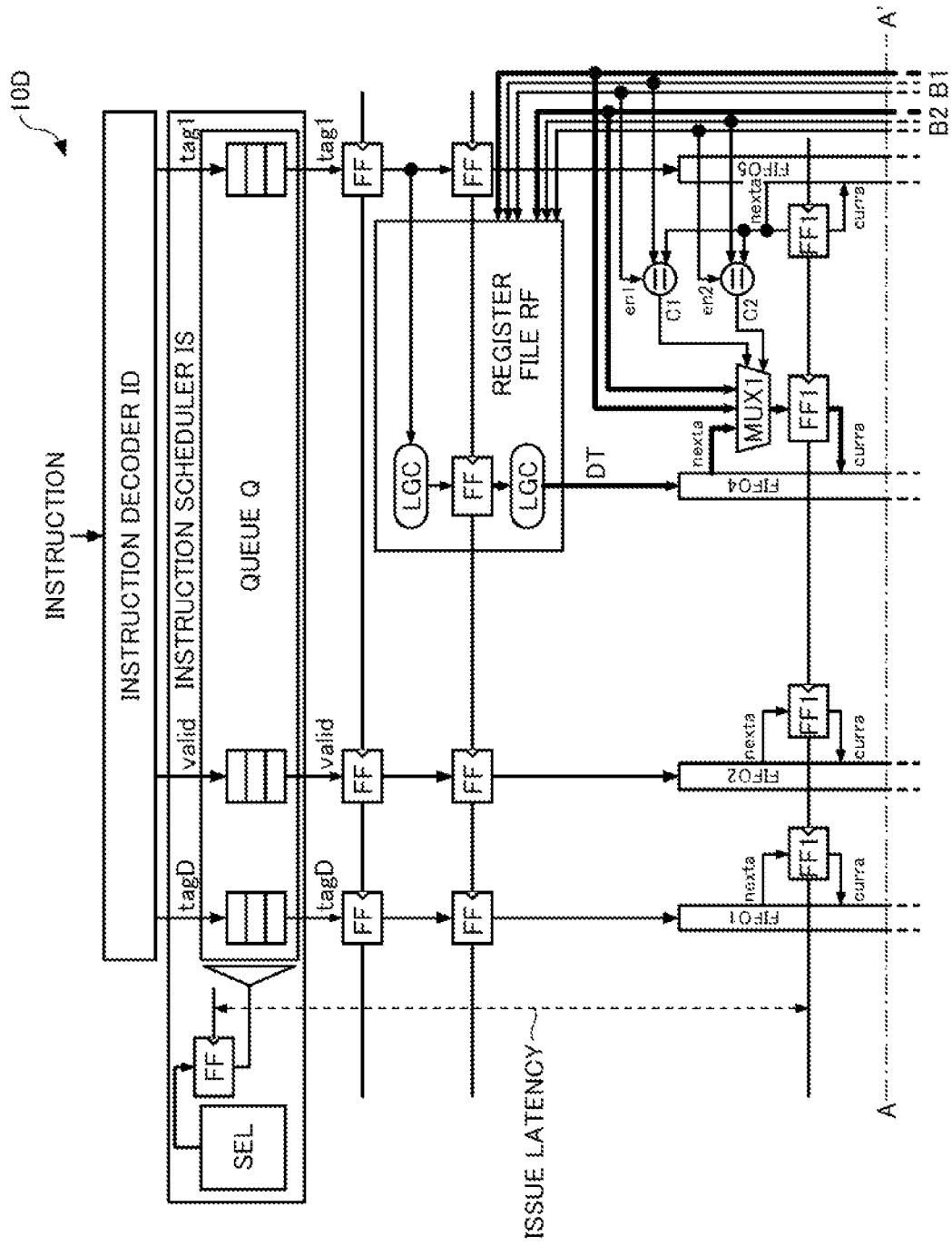
FIG. 13 is a block diagram illustrating an example of the main part of an instruction processing apparatus in another embodiment.
Figure 14:
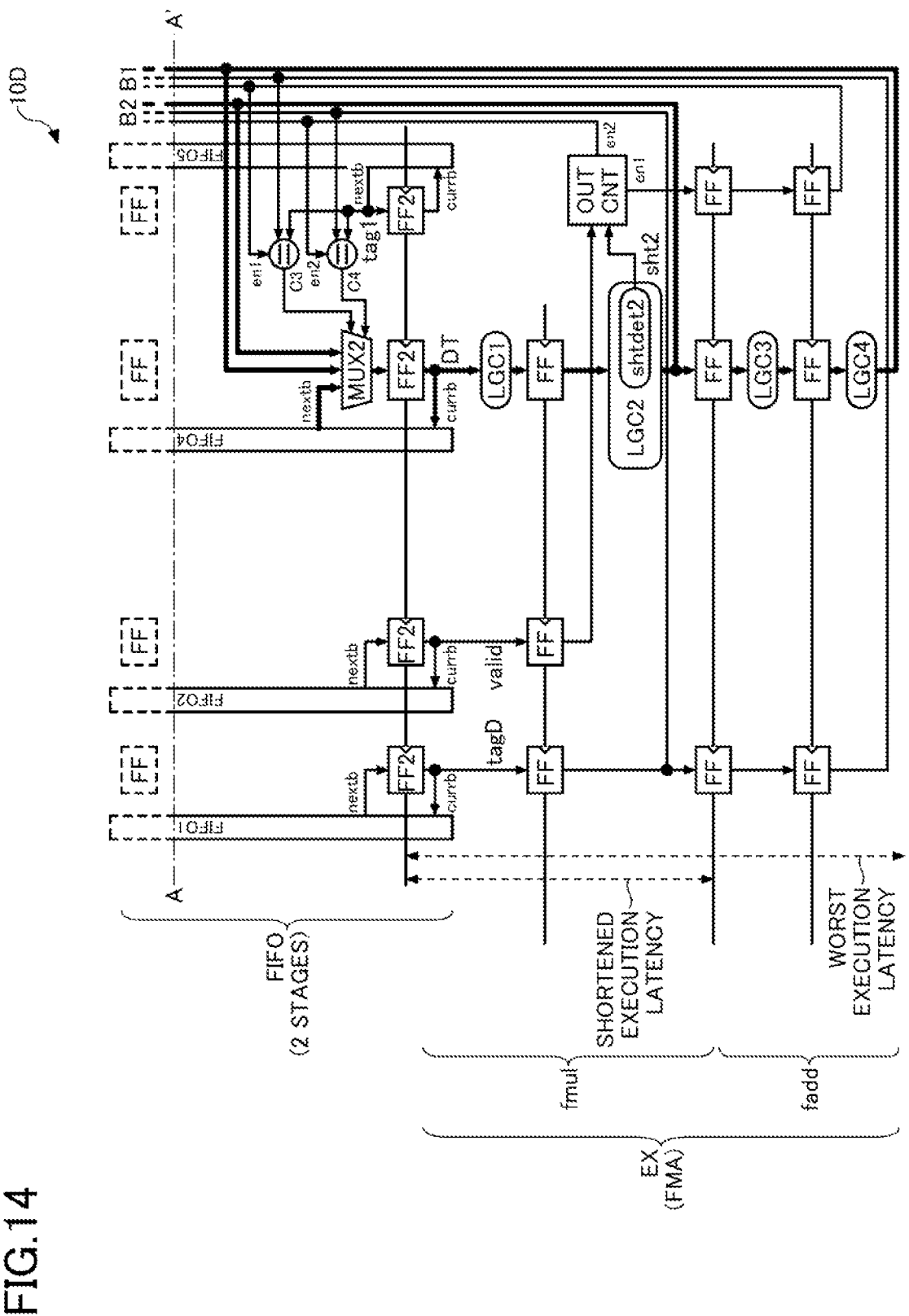
FIG. 14 is a block diagram illustrating the continuation of FIG. 13.

FIGS. 13 and 14 illustrate one example of the main part of the instruction processing apparatus in another embodiment. Elements similar to those in FIGS. 3 and 4 are denoted by the same symbols, and detailed descriptions of those elements are omitted. An instruction processing apparatus 10D illustrated in FIGS. 13 and 14 is, for example, a processor such as a CPU.

The instruction processing apparatus 10D has a configuration similar to the configuration in which the circuit related to the shortened flag sht is removed from the instruction processing apparatus 10B illustrated in FIGS. 3 and 4. Therefore, the instruction decoder ID illustrated in FIG. 13 does not have the shortened detecting unit shtdet1 illustrated in FIG. 3. Whether the execution result is bypassed with the shortened execution latency or the worst execution latency is determined by the shortened detecting unit shtdet2 provided in the logic circuit LGC2.

When the output control circuit OUTCNT receives the valid flag valid of "1" and the shortened flag sht2 of "1", the output control circuit OUTCNT outputs the enable signal en1 of "0" and the enable signal en2 of "1". When the output control circuit OUTCNT receives the valid flag valid of "1" and the shortened flag sht2 of "0", the output control circuit OUTCNT outputs the enable signal en1 of "1" and the enable signal en2 of "0". Thus, the instruction processing apparatus 10D can bypass the execution result with the shortened execution latency when "c" of the preceding instruction fmadd (a*b+c) is "0". The instruction scheduler IS illustrated in FIG. 13 issues a preceding instruction (fmadd) and then issues a subsequent dependent instruction after the shortened execution latency (="2") of the floating-point multiply-add instruction.

As described above, the same effect as the above described embodiment can be obtained in the present embodiment. For example, the shortened detecting unit shtdet2 can determine whether to bypass with the shortened execution latency or with the worst execution latency. Thus, when the execution result can be output with the shortened execution latency, the execution result can be bypassed with the shortened execution latency. As a result, the processing performance of the instruction processing apparatus 10D can be improved compared with the case where the execution result is not bypassed with the shortened execution latency.

Figure 15:
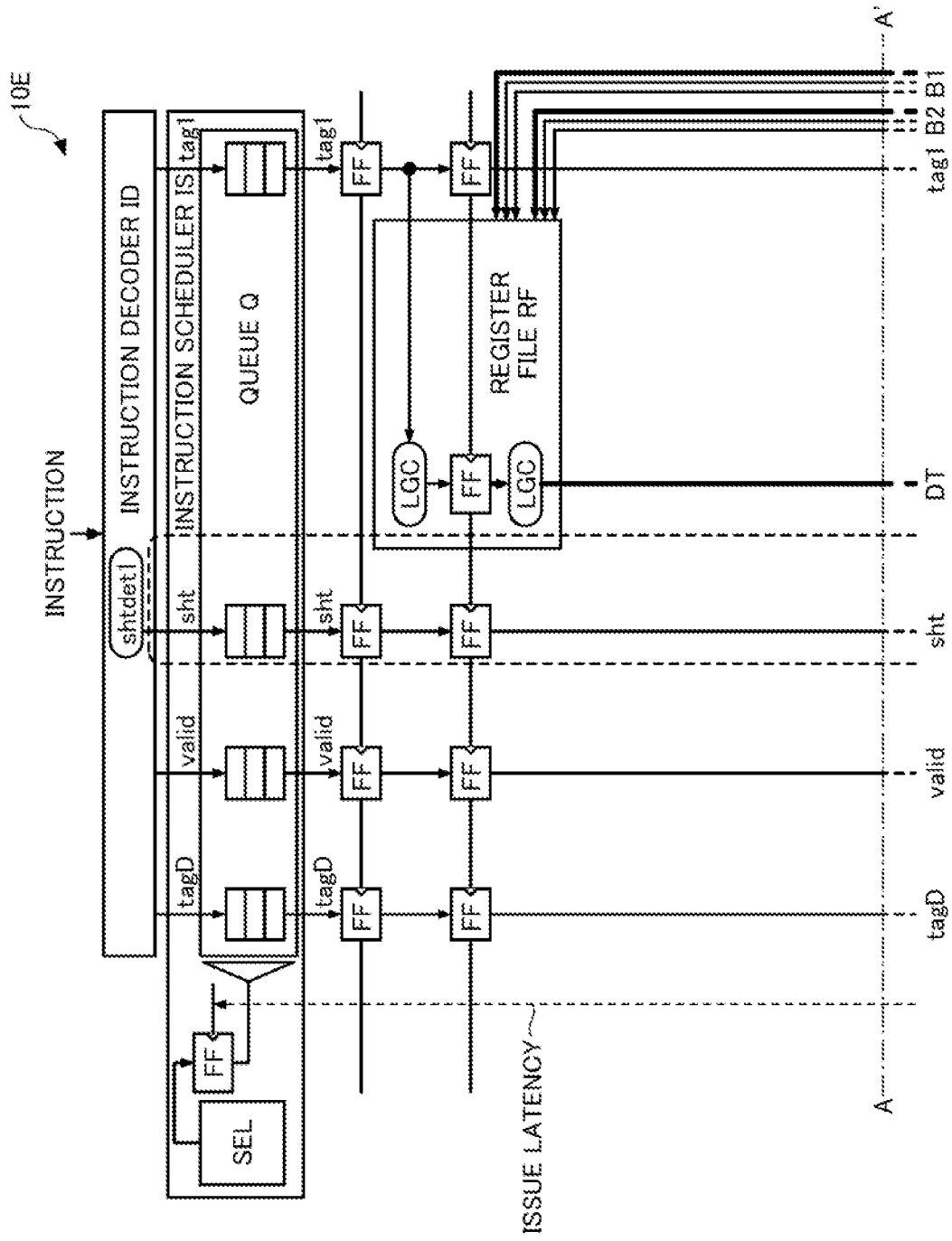
FIG. 15 is a block diagram illustrating an example of the main part of an instruction processing apparatus in another embodiment.
Figure 16:
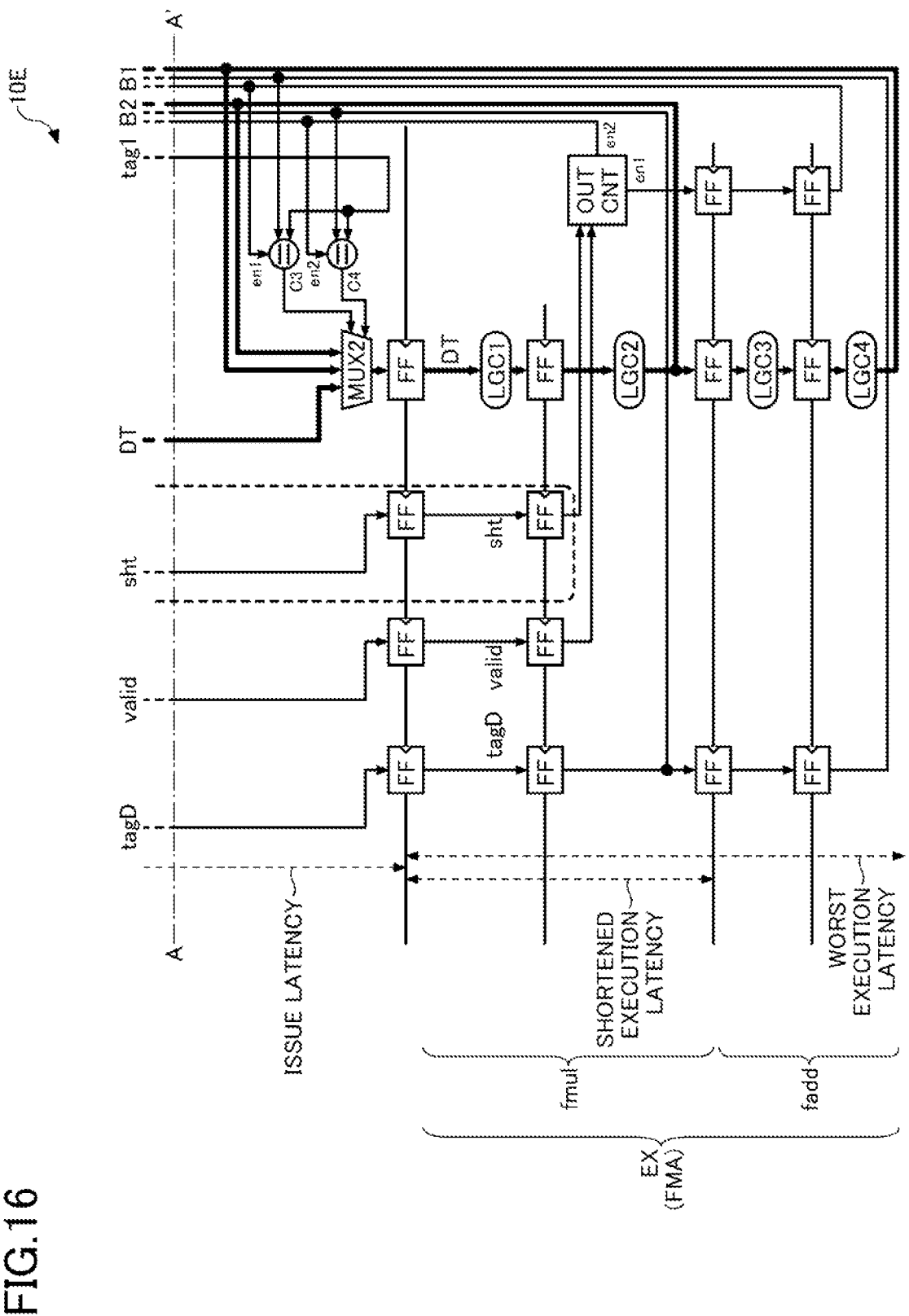
FIG. 16 is a block diagram illustrating the continuation of FIG. 15.

FIGS. 15 and 16 illustrate an example of the main part of the instruction processing apparatus in another embodiment. Elements similar to those in FIGS. 3 and 4 are denoted by the same symbols and detailed descriptions of those elements are omitted. An instruction processing apparatus 10E illustrated in FIGS. 15 and 16 is, for example, a processor such as a CPU.

The instruction processing apparatus 10E has a configuration similar to the configuration in which the circuits related to FIFO 1 to FIFO5 and the shortened flag sht2 are removed from the instruction processing apparatus 10B illustrated in FIGS. 3 and 4. Therefore, the logic circuit LGC2 illustrated in FIG. 16 does not have the shortened detecting unit shtdet2 illustrated in FIG. 4. Whether the execution result is bypassed with the shortened execution latency or the worst execution latency is determined by the shortened detecting unit shtdet1 provided in the instruction decoder ID.

When the output control circuit OUTCNT receives the valid flag valid of "1" and the shortened flag sht of "1", the output control circuit OUTCNT outputs the enable signal en1 of "0" and the enable signal en2 of "1". When the output control circuit OUTCNT receives the valid flag valid of "1" and the shortened flag sht of "0", the output control circuit OUTCNT outputs the enable signal en1 of "1" and the enable signal en2 of "0".

Thus, when the shortened detecting unit shtdet1 detects that the floating-point multiplication instruction is to be executed in the floating-point multiply-add circuit, the instruction processing apparatus 10E can bypass the execution result with the shortened execution latency. The instruction scheduler IS illustrated in FIG. 15 issues a preceding instruction (fmadd) and then issues a subsequent dependent instruction after the shortened execution latency (="2") of the floating-point multiply-add instruction.

As described above, the same effect as the above described embodiment can be obtained in the present embodiment. For example, the shortened detecting unit shtdet1 can determine whether to bypass the execution result with the shortened execution latency or the worst execution latency. Thus, when the execution result can be output with the shortened execution latency, the execution result can be bypassed with the shortened execution latency. As a result, the processing performance of the instruction processing apparatus 10E can be improved compared with the case where the execution result is not bypassed with the shortened execution latency.

Figure 17:
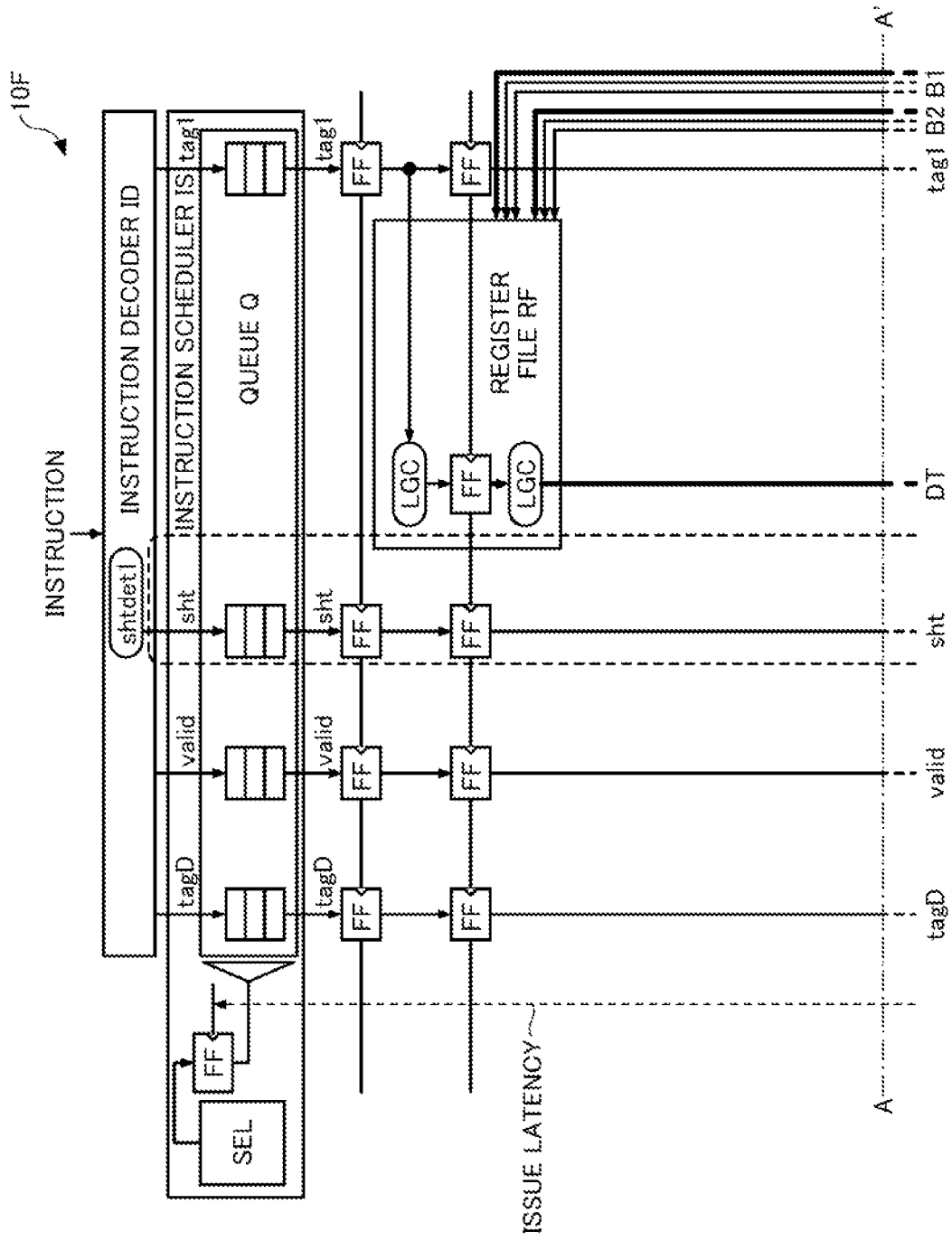
FIG. 17 is a block diagram illustrating an example of the main part of an instruction processing apparatus in another embodiment.
Figure 18:
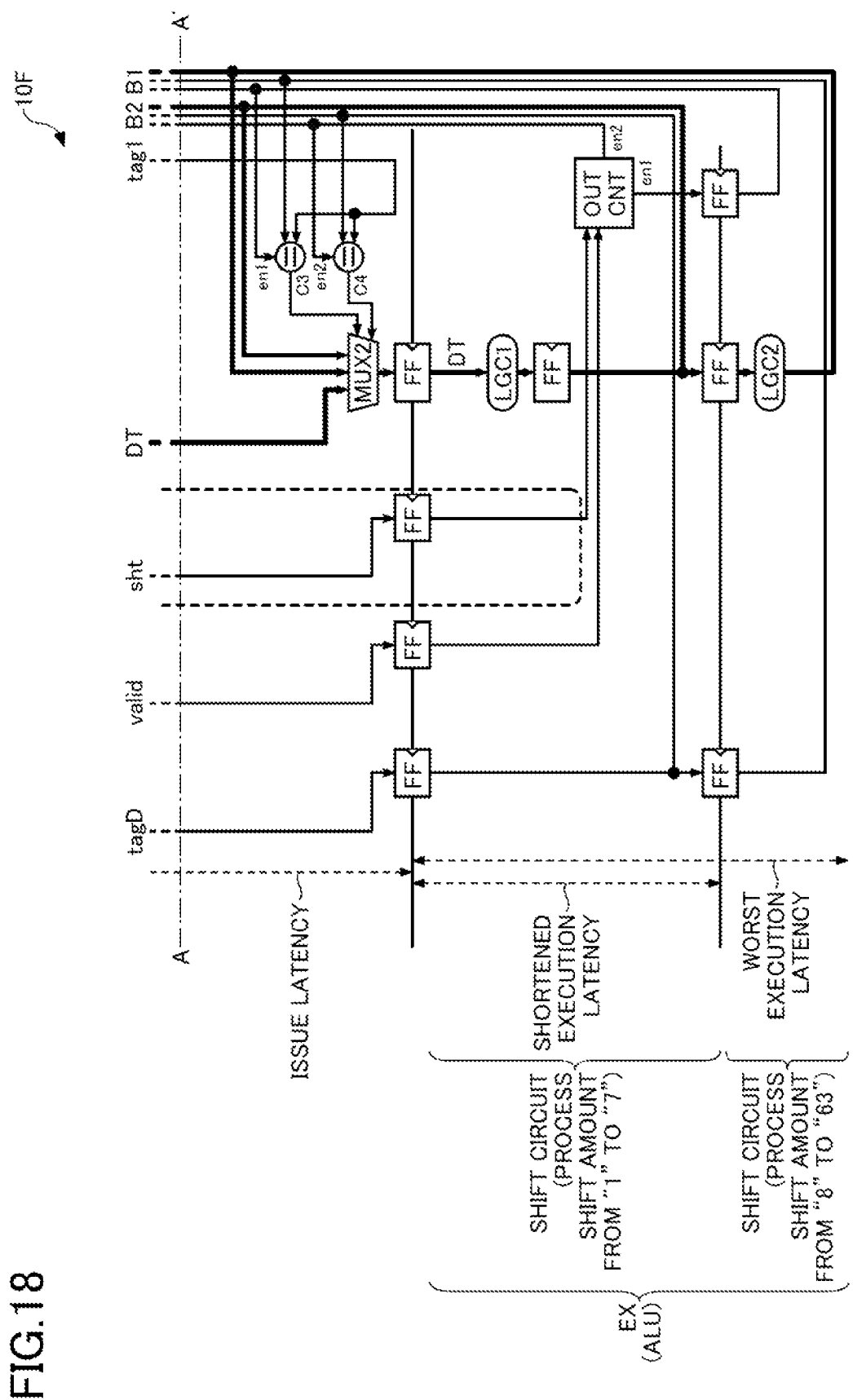
FIG. 18 is a block diagram illustrating the continuation of FIG. 17.

FIGS. 17 and 18 illustrate an example of the main part of the calculation processor in another embodiment. Elements similar to those in FIGS. 3 and 4 are denoted by the same symbols and detailed descriptions of those elements are omitted. An instruction processing apparatus 10F illustrated in FIGS. 17 and 18 is, for example, a processor such as a CPU.

The instruction processing apparatus 10F has the same configuration as the instruction processing apparatus 10B illustrated in FIG. 3 and FIG. 4 in which the FIFO1 to FIFO5 units and the circuit related to the shortened flag sht2 are removed. Therefore, the execution unit EX illustrated in FIG. 18 does not include the shortened detecting unit shtdet2 illustrated in FIG. 4. Whether the execution result is bypassed with the shortened execution latency or the worst execution latency is determined by the shortened detecting unit shtdet1 provided in the instruction decoder ID.

The execution unit EX of the instruction processing apparatus 10F includes an arithmetic logic unit ALU including logic circuits LGC1 and LGC2 connected in series, which are capable of executing shift instructions. The logic circuit LGC1 is an example of a shift circuit that processes shift amounts from "1" to "7". The logic circuit LGC2 is an example of a shift circuit that processes shift amounts from "8" to "63".

Then, in a shift instruction to which the shift amount is given by an immediate value, the shortened detecting unit shtdet1 of the instruction decoder ID sets the shortened flag to "1" when the shift amount is from "1" to "7", and sets the shortened flag to "0" when the shift amount is from "8" to "63". The shortened flag sht set by the shortened detecting unit shtdet1 is transferred to the output control circuit OUTCNT.

When the output control circuit OUTCNT receives the valid flag valid of "1" and the shortened flag sht of "1", the output control circuit OUTCNT outputs the enable signal en1 of "0" and the enable signal en2 of "1". When the output control circuit OUTCNT receives the valid flag valid of "1" and the shortened flag sht of "0", the output control circuit OUTCNT outputs the enable signal en1 of "1" and the enable signal en2 of "0".

Thus, when the shift amount of the preceding shift instruction is from "1" to "7", the instruction processing apparatus 10F can bypass the execution result of the shift instruction with the shortened execution latency. When the shift amount of the preceding shift instruction is from "8" to "63", the instruction processing apparatus 10E bypasses the execution result of the shift instruction with the worst execution latency. The instruction scheduler IS illustrated in FIG. 17 issues the preceding instruction (shift instruction) and then issues the subsequent dependent instruction after the shortened execution latency (="1") of the shift instruction. Usually, the arithmetic logic unit ALU is implemented so that the instruction is completed in one cycle, so the performance advantage is considered to be small. However, for example, further frequency improvement can be expected.

As described above, the same effect as the above described embodiment can be obtained in the present embodiment. For example, the shortened detecting unit shtdet1 can determine whether to bypass the execution result with the shortened execution latency or the worst execution latency. Thus, when the execution result can be output with the shortened execution latency, the execution result can be bypassed with the shortened execution latency.

For example, in a shift instruction in which the shift amount is given by an immediate value, when the shift amount is small and the execution result can be obtained by the logic circuit LGC1, the execution result can be bypassed with the shortened execution latency. As a result, the processing performance of the instruction processing apparatus 10F can be improved compared with the case in which the execution result is not bypassed with the shortened execution latency.

Figure 19:
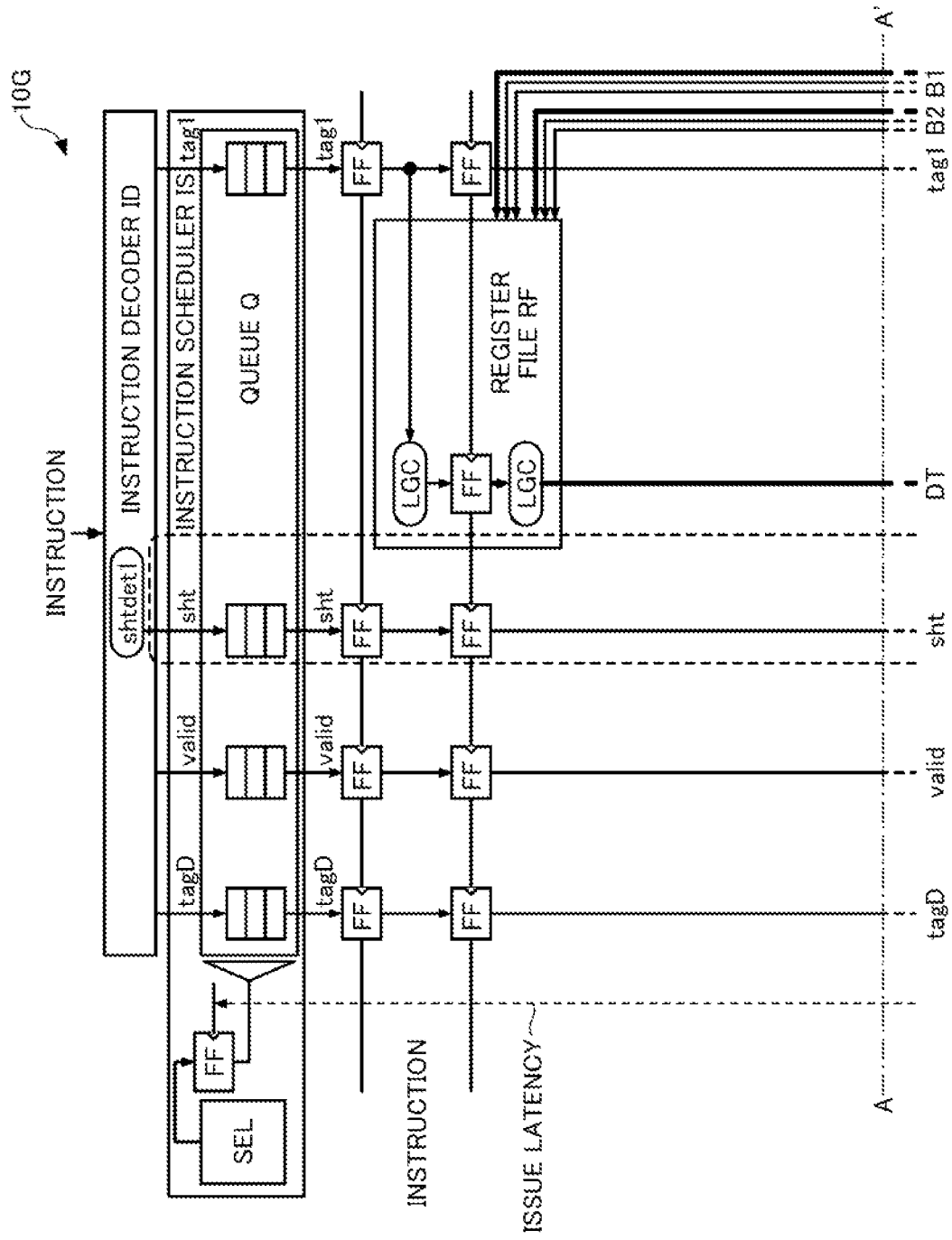
FIG. 19 is a block diagram illustrating an example of the main part of an instruction processing apparatus in another embodiment.
Figure 20:
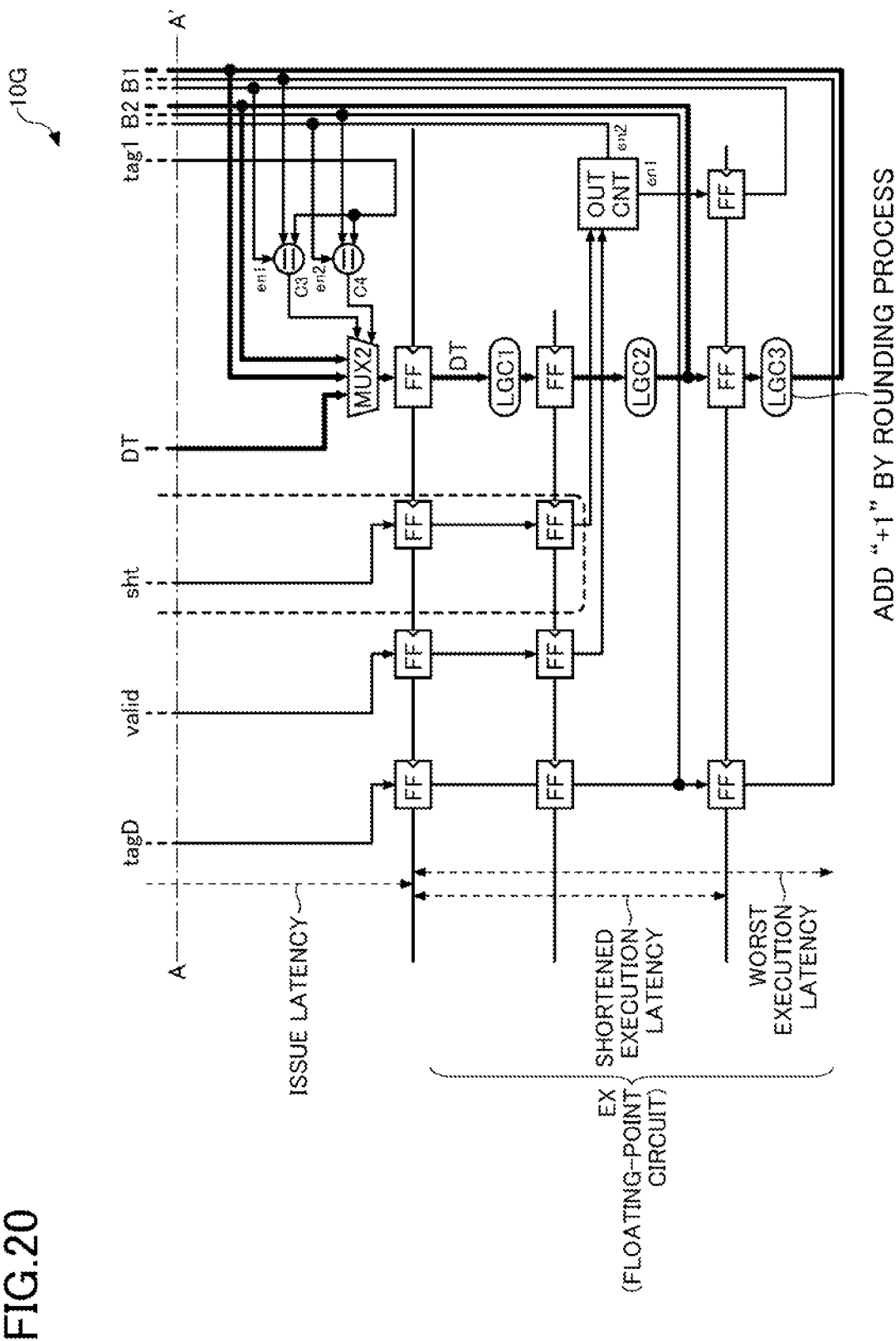
FIG. 20 is a block diagram illustrating the continuation of FIG. 19.

FIGS. 19 and 20 illustrate an example of the main part of the instruction processing apparatus in another embodiment. Elements similar to those in FIGS. 3 and 4 are denoted by the same symbols and detailed descriptions of those elements are omitted. An instruction processing apparatus 10G illustrated in FIGS. 19 and 20 is, for example, a processor such as a CPU.

The instruction processing apparatus 10G has the same configuration as the instruction processing apparatus 10B illustrated in FIG. 3 and FIG. 4 in which the FIFO 1 to FIFO5 units and the circuit related to the shortened flag sht2 are removed. Therefore, the logic circuit LGC2 illustrated in FIG. 20 does not include the shortened detecting unit shtdet2 illustrated in FIG. 4. Whether the execution result is bypassed with the shortened execution latency or the worst execution latency is determined by the shortened detecting unit shtdet1 provided in the instruction decoder ID.

The execution unit EX of the instruction processing apparatus 10G has a floating-point circuit including logic circuits LGC1, LGC2, and LGC3. The logic circuits LGC1 and LGC2 operate as floating-point operators that execute floating-point instructions. The logic circuit LGC3 operates as a rounding processing circuit that executes a rounding process that adds "+1" to the execution result.

For example, the instruction processing apparatus 10G adopts IEEE (The Institute of Electrical and Electronics Engineers) 754 (floating-point instruction standard). The IEEE 754 rounding modes include "round to nearest", "round to zero", "round to+infinity", and "round to−infinity". Among the four rounding modes, "round to zero" does not cause "+1" addition.

The shortened detecting unit shtdet1 of the instruction decoder ID detects early termination when decoding a floating-point instruction whose rounding mode is "round to zero" and sets the shortened flag sht to "1". The shortened detecting unit shtdet1 sets the shortened flag sht to "0" when decoding a floating-point instruction whose rounding mode is other than "round to zero".

Thus, when executing a floating-point multiplication instruction whose rounding mode is "round to zero", the execution result can be bypassed with the shortened execution latency. The instruction scheduler IS illustrated in FIG. 19 issues a preceding instruction (a floating-point instruction) and then issues a subsequent dependent instruction after the shortened execution latency (="2") of the floating-point instruction.

As described above, the same effect as the above described embodiment can be obtained in the present embodiment. For example, the shortened detecting unit shtdet1 can determine whether to bypass the execution result with the shortened execution latency or with the worst execution latency. Thus, when the execution result can be output with the shortened execution latency, the execution result can be bypassed with the shortened execution latency.

For example, when a floating-point instruction whose rounding mode is "round to zero" is decoded, the execution result can be bypassed with the shortened execution latency. As a result, the processing performance of the instruction processing apparatus 10G can be improved compared with the case where the instruction is not bypassed with the shortened execution latency.

Figure 21:
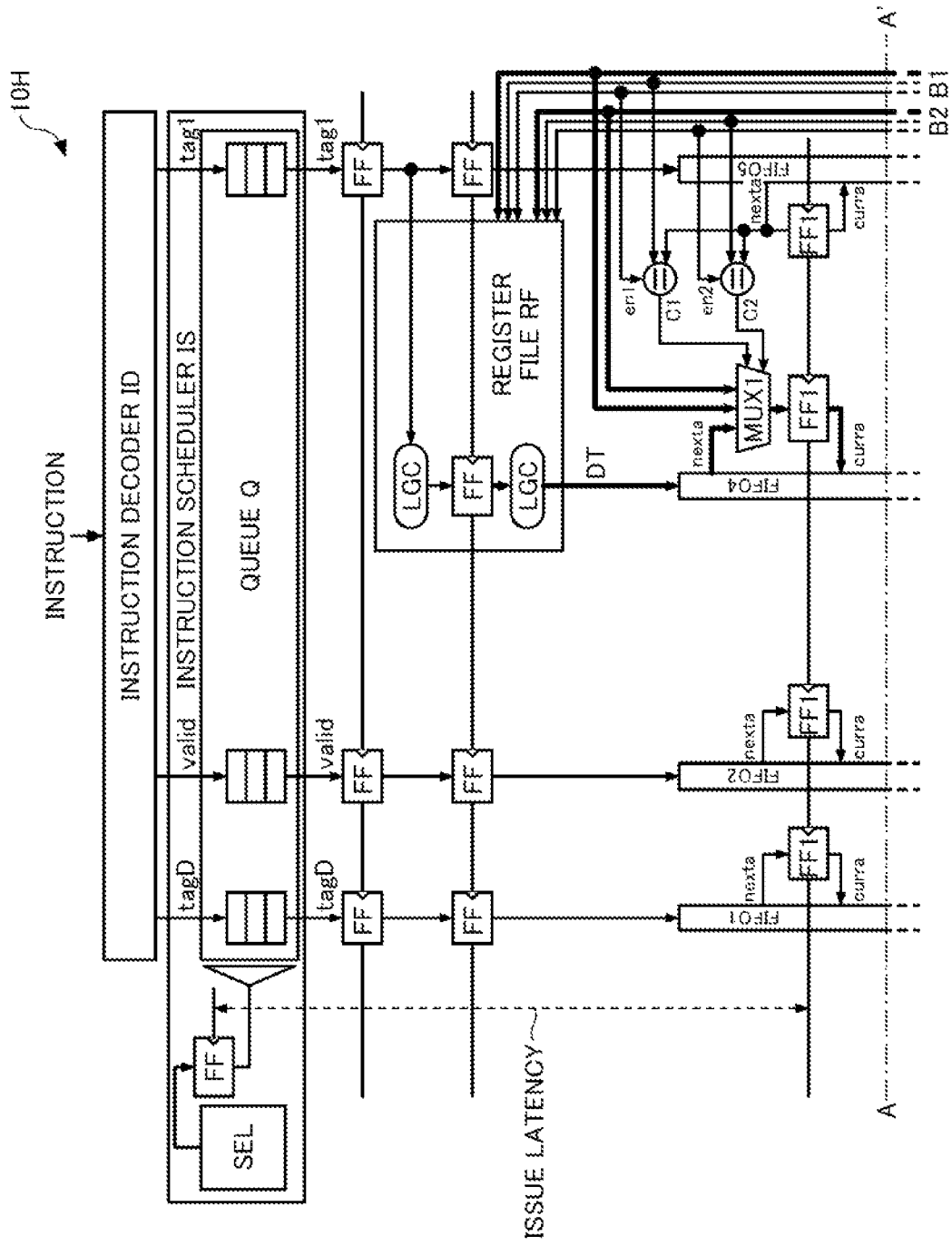
FIG. 21 is a block diagram illustrating an example of the main part of an instruction processing apparatus in another embodiment.
Figure 22:
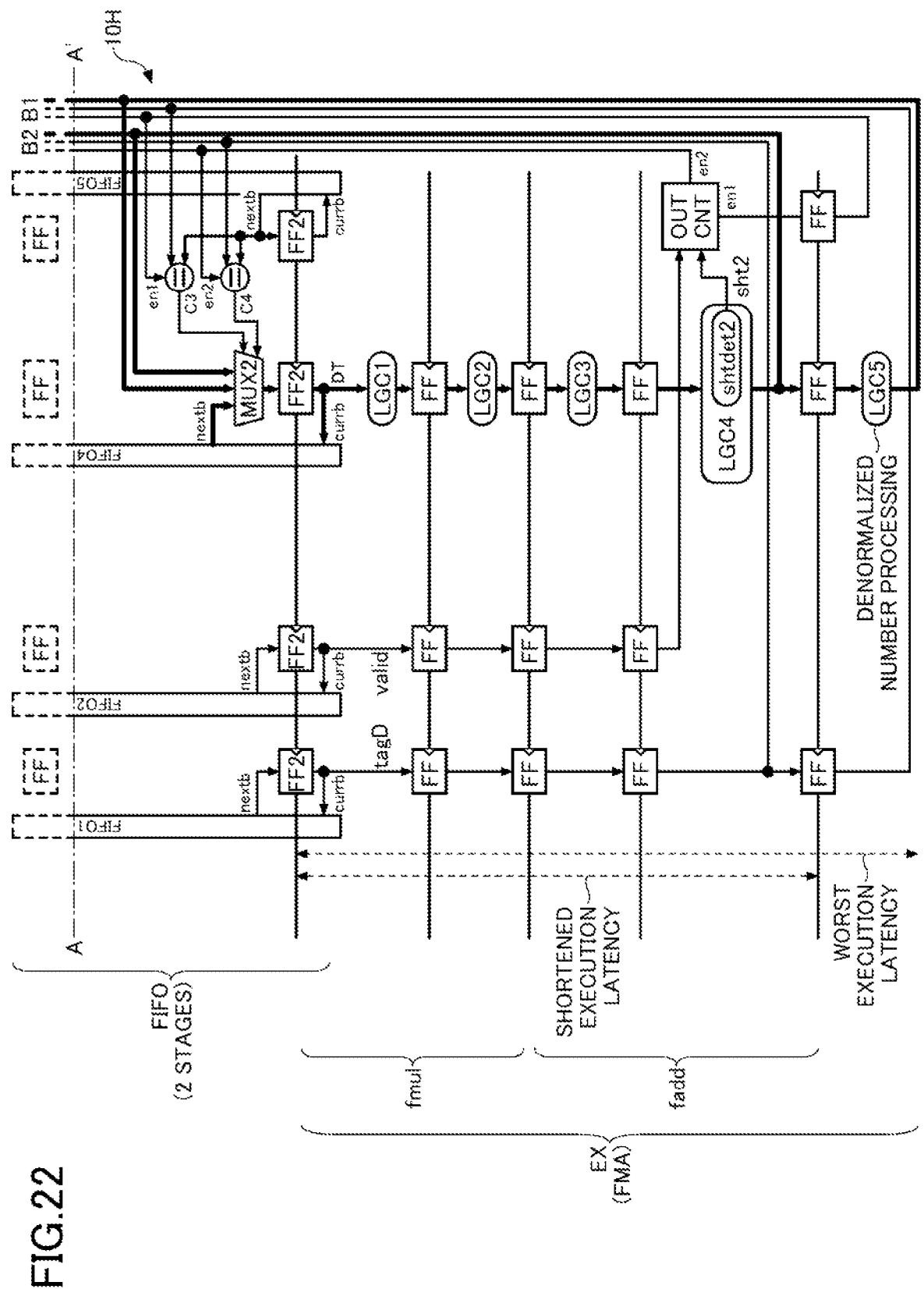
FIG. 22 is a block diagram illustrating the continuation of FIG. 21.

FIGS. 21 and 22 illustrate an example of the main part of the instruction processing apparatus in another embodiment. Elements similar to those in FIGS. 3 and 4 are denoted by the same symbols and detailed descriptions of those elements are omitted. An instruction processing apparatus 10H illustrated in FIGS. 21 and 22 is, for example, a processor such as a CPU.

In the instruction processing apparatus 10H, the circuit related to the shortened flag sht in the instruction processing apparatus 10B illustrated in FIGS. 3 and 4 is removed. Therefore, the instruction decoder ID illustrated in FIG. 21 does not include the shortened detecting unit shtdet1 illustrated in FIG. 3. The shortened detecting unit shtdet2 is mounted on the logic circuit LGC4.

In the instruction processing apparatus 10H, the logic circuit LGC5 is added to the FMA of the instruction processing apparatus 10B illustrated in FIG. 3 and FIG. 4 to perform processing when the addition result is a denormalized number. The logic circuit LGC5 operates as a denormalized number processing circuit to perform processing when the execution result in the logic units LGC1 to LGC4 is a denormalized number. A denormalized number is a number that represents, without normalization, a value close to "0" that cannot be represented by a normalized floating-point value. Other configurations of the instruction processing apparatus 10H are similar to those of the instruction processing apparatus 10B illustrated in FIGS. 3 and 4.

In the FMA of the present embodiment, the shortened execution latency is set to four cycles of executing the multiply-add instruction (fmul+fadd) and the worst execution latency is set to five cycles of executing the multiply-add instruction and executing the denormalized number processing. When the result of the multiply-add instruction obtained by the logic circuit LGC4 is not a denormalized number, the shortened detecting unit shtdet2 detects early termination and sets the shortened flag sht2 to "1". When the result of the multiply-add instruction obtained by the logic circuit LGC4 is a denormalized number, the shortened detecting unit shtdet2 sets the shortened flag sht2 to "0".

Thus, when the result of the multiply-add instruction is not a denormalized number, the execution result can be bypassed with the shortened execution latency. The instruction scheduler IS illustrated in FIG. 21 issues a preceding instruction (a multiply-add instruction) and then a subsequent dependent instruction after the shortened execution latency (="4") of the floating-point multiply-add instruction.

As described above, the same effect as the above described embodiment can be obtained in the present embodiment. For example, the shortened detecting unit shtdet2 can determine whether to bypass the execution result with the shortened execution latency or the worst execution latency. Thus, when the execution result can be output with the shortened execution latency, the execution result can be bypassed with the shortened execution latency.

For example, if the multiply-add execution result is not a denormalized number, the execution result can be bypassed with a shortened execution latency. As a result, the processing performance of the instruction processing apparatus 10H can be improved compared with the case where the execution result is not bypassed with a shortened execution latency.

Figure 23:
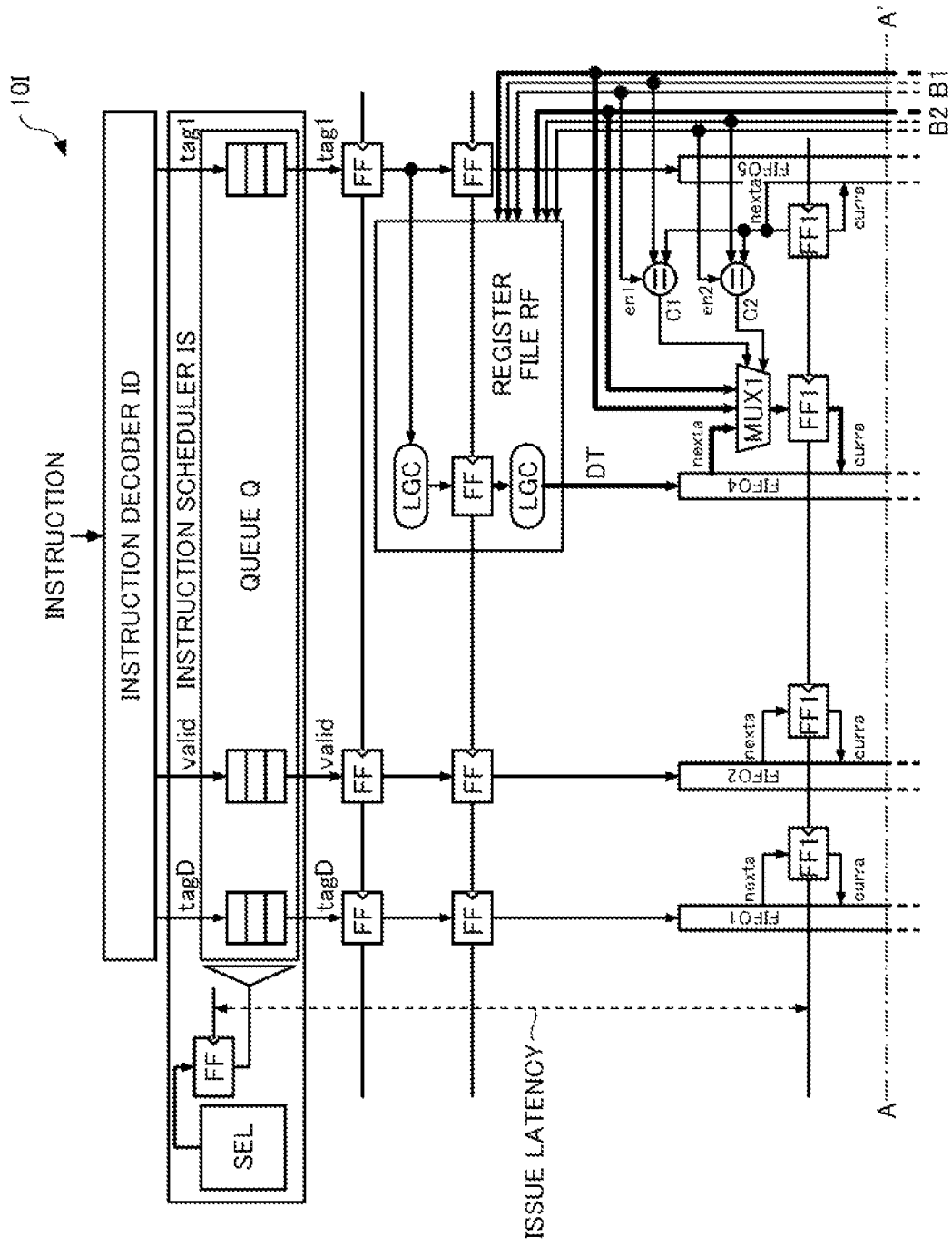
FIG. 23 is a block diagram illustrating an example of the main part of an instruction processing apparatus in another embodiment.
Figure 24:
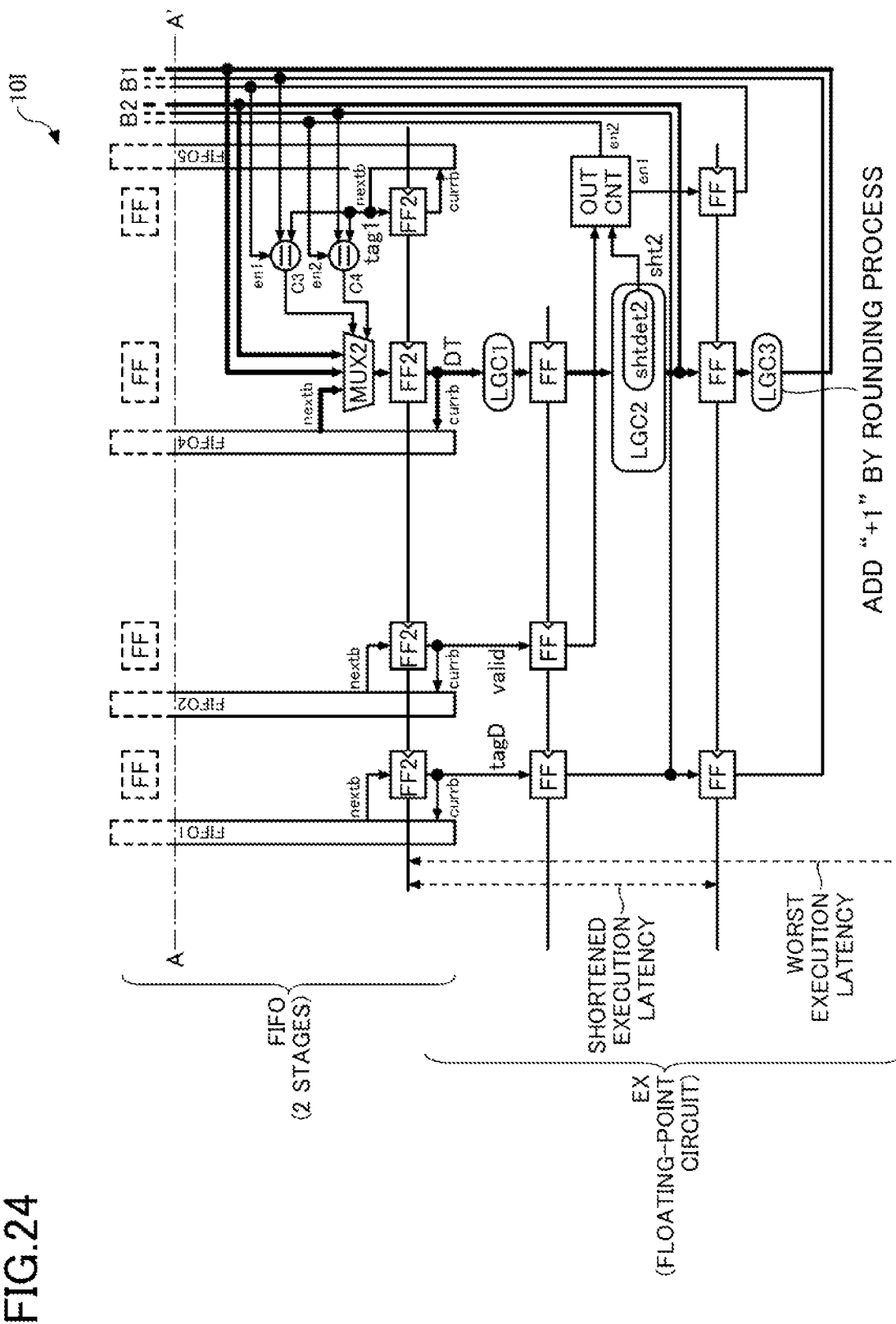
FIG. 24 is a block diagram illustrating the continuation of FIG. 23.

FIGS. 23 and 24 illustrate an example of the main part of the instruction processing apparatus in another embodiment. Elements similar to those in FIGS. 3 and 4 are denoted by the same symbols and detailed descriptions of those elements are omitted. An instruction processing apparatus 10I illustrated in FIGS. 23 and 24 is, for example, a processor such as a CPU.

In the instruction processing apparatus 10I, the circuit related to the shortened flag sht is removed from the instruction processing apparatus 10B illustrated in FIGS. 3 and 4. Therefore, the instruction decoder ID illustrated in FIG. 23 does not include the shortened detecting unit shtdet1 illustrated in FIG. 3.

The execution unit EX of the instruction processing apparatus 10I includes a floating-point circuit including the logic circuits LGC1, LGC2, and LGC3 for executing floating-point instructions, as in FIG. 20. The logic circuits LGC1 and LGC2 operate as floating-point operators for executing a floating-point instruction. The logic circuit LGC3 operates as a rounding processing circuit for executing rounding that adds "+1" to the execution result.

When "+1" addition does not occur in the rounding of the floating-point instruction, the shortened detecting unit shtdet2 detects early termination and sets the shortened flag sht2 to "1". When "+1" addition occurs in the rounding of the floating-point instruction, the shortened detecting unit shtdet2 sets the shortened flag sht2 to "0".

Figure 25:
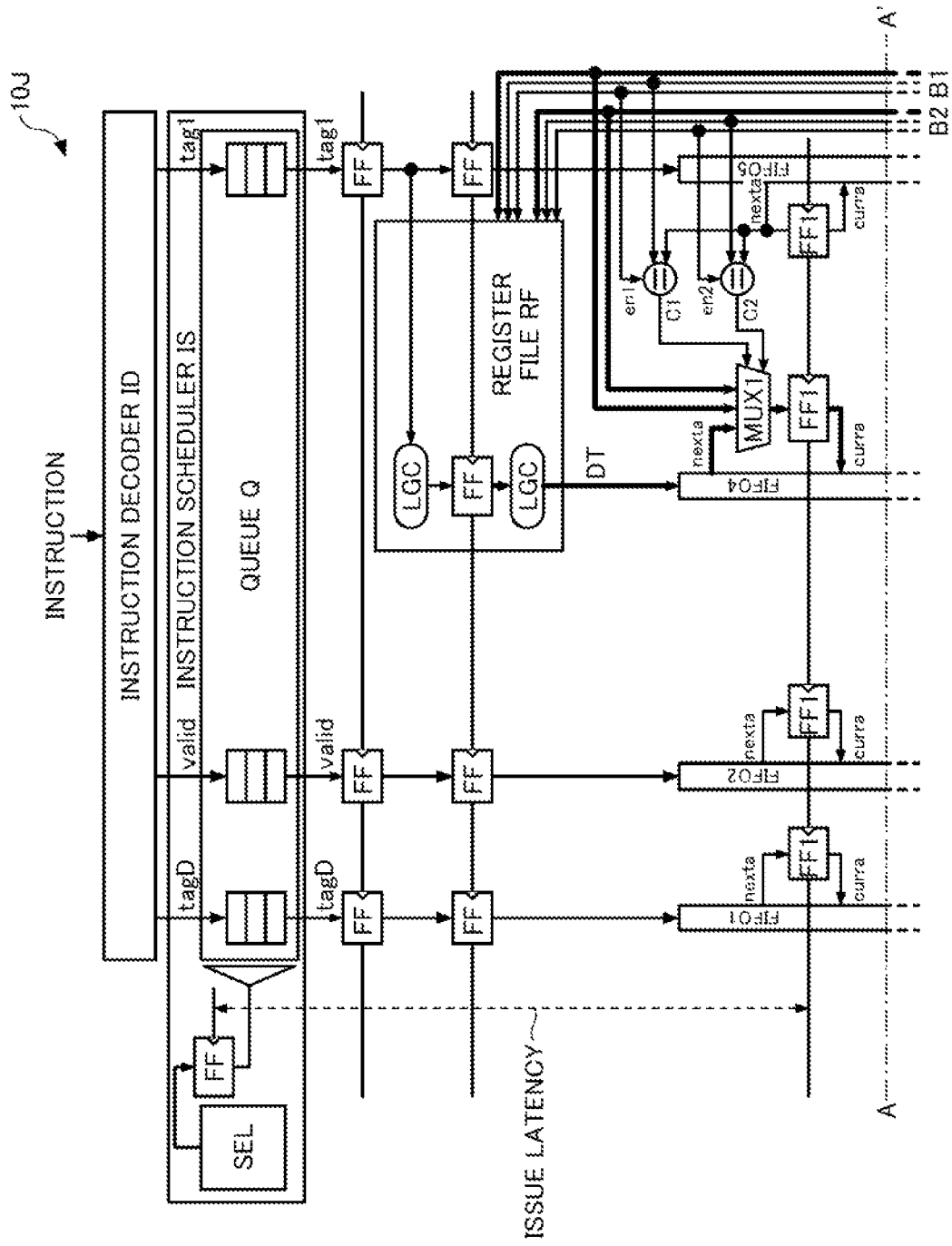
FIG. 25 is a block diagram illustrating an example of the main part of an instruction processing apparatus in another embodiment.

Thus, when "+1" addition does not occur in the rounding of the floating-point instruction, the execution result can be bypassed with the shortened execution latency. The instruction scheduler IS illustrated in FIG. 25 issues a preceding instruction (floating-point instruction) and then issues a subsequent dependent instruction after the shortened execution latency (="2") of the floating-point instruction.

As in FIG. 19, the instruction decoder ID may include the shortened detecting unit shtdet1 that sets the shortened flag sht to "1" when decoding a floating-point instruction whose rounding mode is "round to zero". At this time, the output control circuit OUTCNT operates in response to the shortened flag sht from the shortened detecting unit shtdet1 and the shortened flag sht2 from the shortened detecting unit shtdet2, as in FIG. 4.

In this case, when executing the floating-point instruction whose rounding mode is "round to zero", the execution result is bypassed with the shortened execution latency by the flag sht from the shortened detecting unit shtdet1. When "+1" addition does not occur in the rounding of the floating-point instruction whose rounding mode is "round to zero", the shortened detecting unit shtdet2 detects early termination and sets the shortened flag sht2 to "1".

As described above, the same effect as the above described embodiment can be obtained in the present embodiment. For example, the shortened detecting unit shtdet2 can determine whether to bypass the execution result with the shortened execution latency or the worst execution latency. Thus, when the execution result can be output with the shortened execution latency, the execution result can be bypassed with the shortened execution latency.

For example, if "+1" addition does not occur in the rounding of a floating-point instruction, the execution result can be bypassed with a shortened execution latency. As a result, the processing performance of the instruction processing apparatus 10I can be improved compared with the case of not bypassing with a shortened execution latency.

Figure 26:
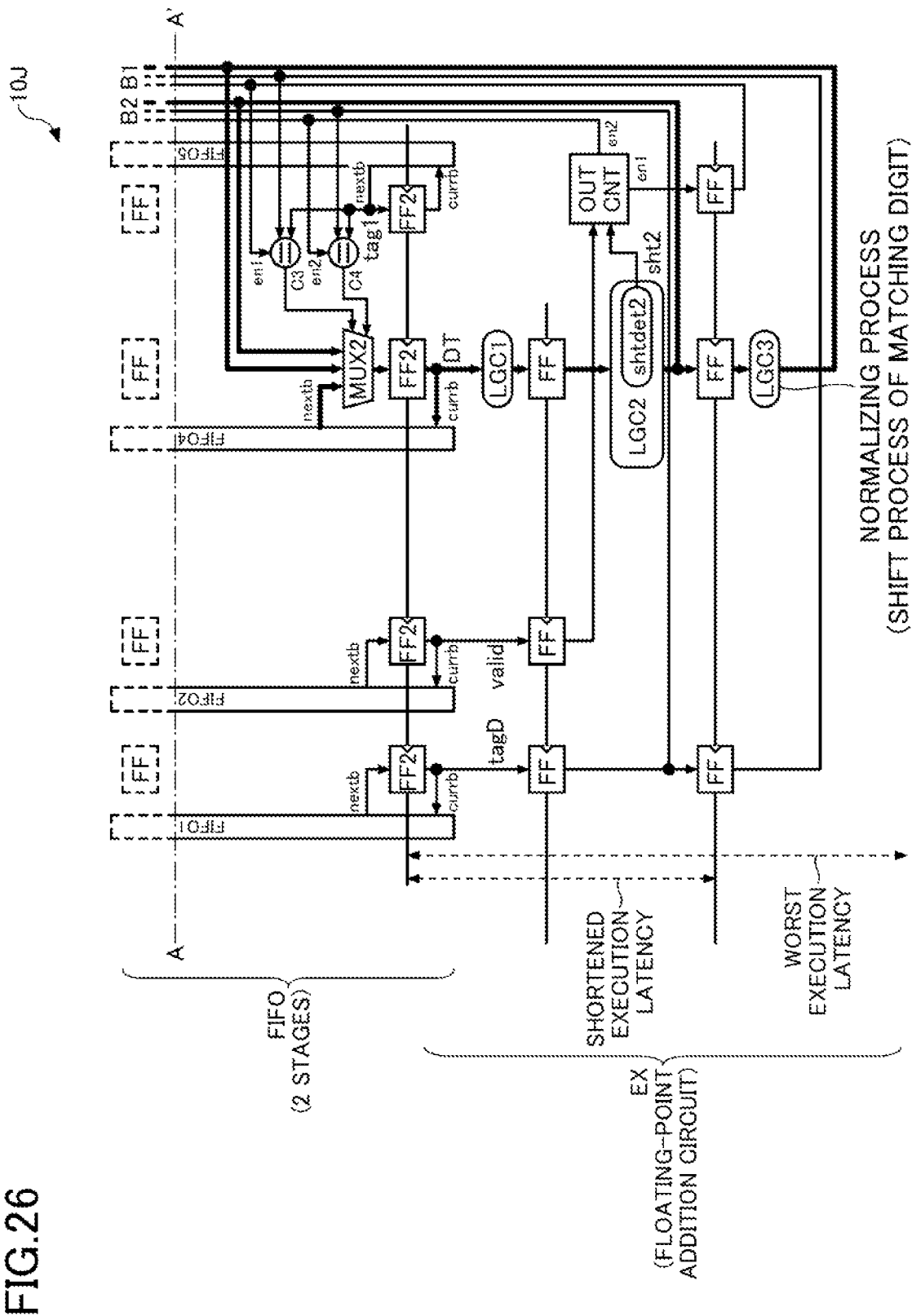
FIG. 26 is a block diagram illustrating the continuation of FIG. 25.

FIGS. 25 and 26 illustrate an example of the main part of the instruction processing apparatus in another embodiment. Elements similar to those in FIGS. 3 and 4 are denoted by the same symbols and detailed descriptions of those elements are omitted. An instruction processing apparatus 10J illustrated in FIGS. 25 and 26 is, for example, a processor such as a CPU.

In the instruction processing apparatus 10J, the circuit related to the shortened flag sht is removed from the instruction processing apparatus 10B illustrated in FIGS. 3 and 4. Therefore, the instruction decoder ID illustrated in FIG. 25 does not include the shortened detecting unit shtdet1 illustrated in FIG. 3. The shortened detecting unit shtdet2 is mounted on the logic circuit LGC2.

The execution unit EX of the instruction processing apparatus 10J includes a floating-point addition circuit including the logic circuits LGC1, LGC2, and LGC3 that execute floating-point addition instructions. The logic circuits LGC1 and LGC2 operate as floating-point adders that execute addition processing. The logic circuit LGC3 operates as a normalization processing circuit that executes normalization processing (shifting of digit matching) of the addition result.

The shortened detecting unit shtdet2 detects whether the addition result (for example, subtraction result) obtained by the logic circuit LGC2 is to be subjected to normalization (shifting processing) of the last digit matching. For example, the shortened detecting unit shtdet2 detects whether the last digit matching has already been normalized by referring to the mantissa part. Here, if the values to be subtracted are apart from each other, the last normalization may be unnecessary.

When normalization processing for digit matching after the instruction by the logic circuit LGC2 is unnecessary, the shortened detecting unit shtdet2 detects early termination and sets the shortened flag sht2 to "1". When normalization processing for digit matching is to be performed after the instruction by the logic circuit LGC2, the shortened detecting unit shtdet2 sets the shortened flag sht2 to "0".

Thus, when the last normalization processing of the addition result is not to be performed, the execution result can be bypassed with the shortened execution latency. The instruction scheduler IS illustrated in FIG. 25 issues a preceding instruction (a floating-point addition instruction) and then issues a subsequent dependent instruction after the shortened execution latency (="2") of the floating-point addition instruction.

As described above, the same effect as the above described embodiment can be obtained in the present embodiment. For example, the shortened detecting unit shtdet2 can determine whether to bypass the execution result with the shortened execution latency or the worst execution latency. Thus, when the execution result can be output with the shortened execution latency, the execution result can be bypassed with the shortened execution latency.

For example, when normalization of the last digit matching is not to be performed in addition by a floating-point addition circuit, the execution result can be bypassed with the shortened execution latency. As a result, the processing performance of the instruction processing apparatus 10J can be improved compared with the case where the execution result is not bypassed with the shortened execution latency.

Figure 27:
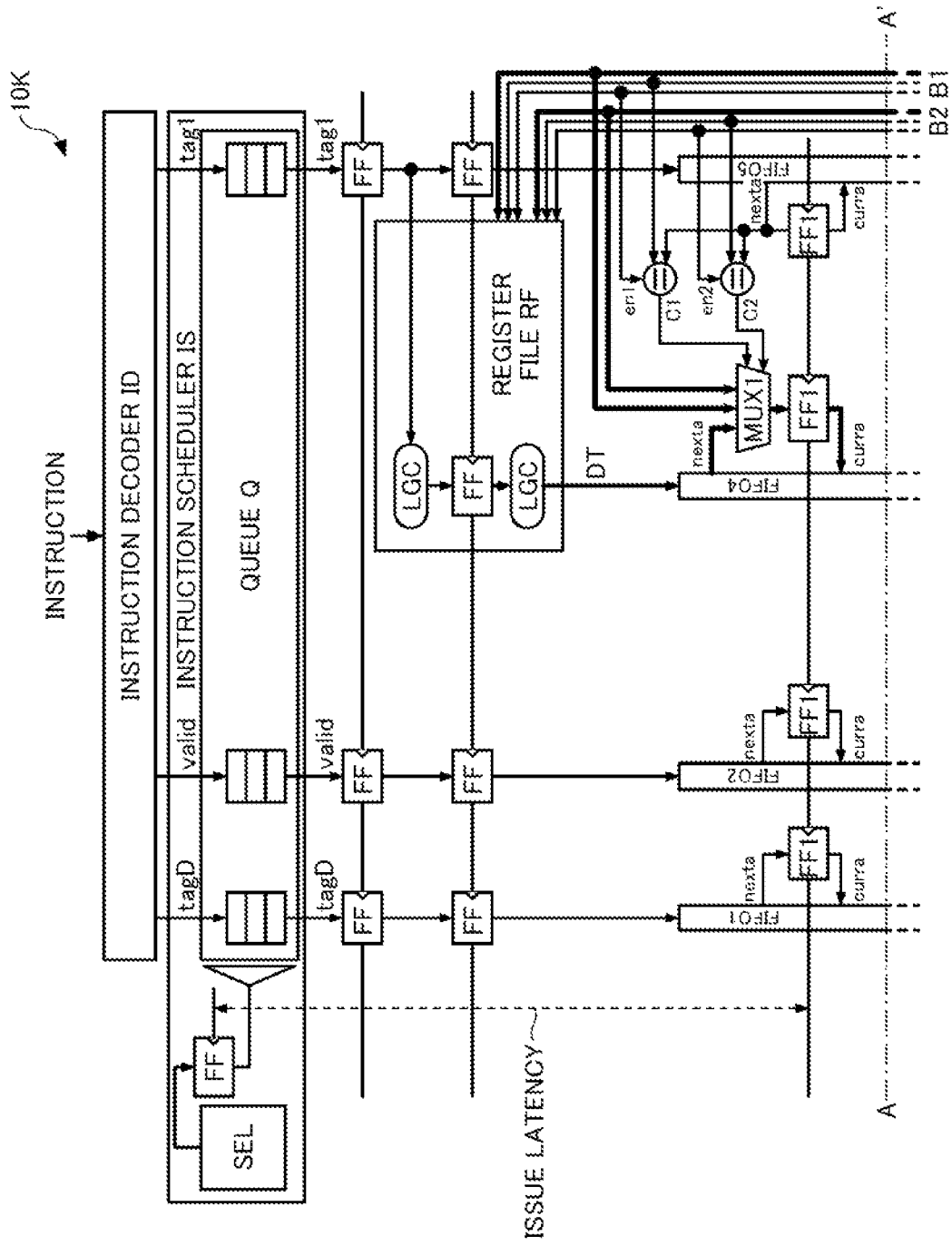
FIG. 27 is a block diagram illustrating an example of the main part of an instruction processing apparatus in another embodiment.
Figure 28:
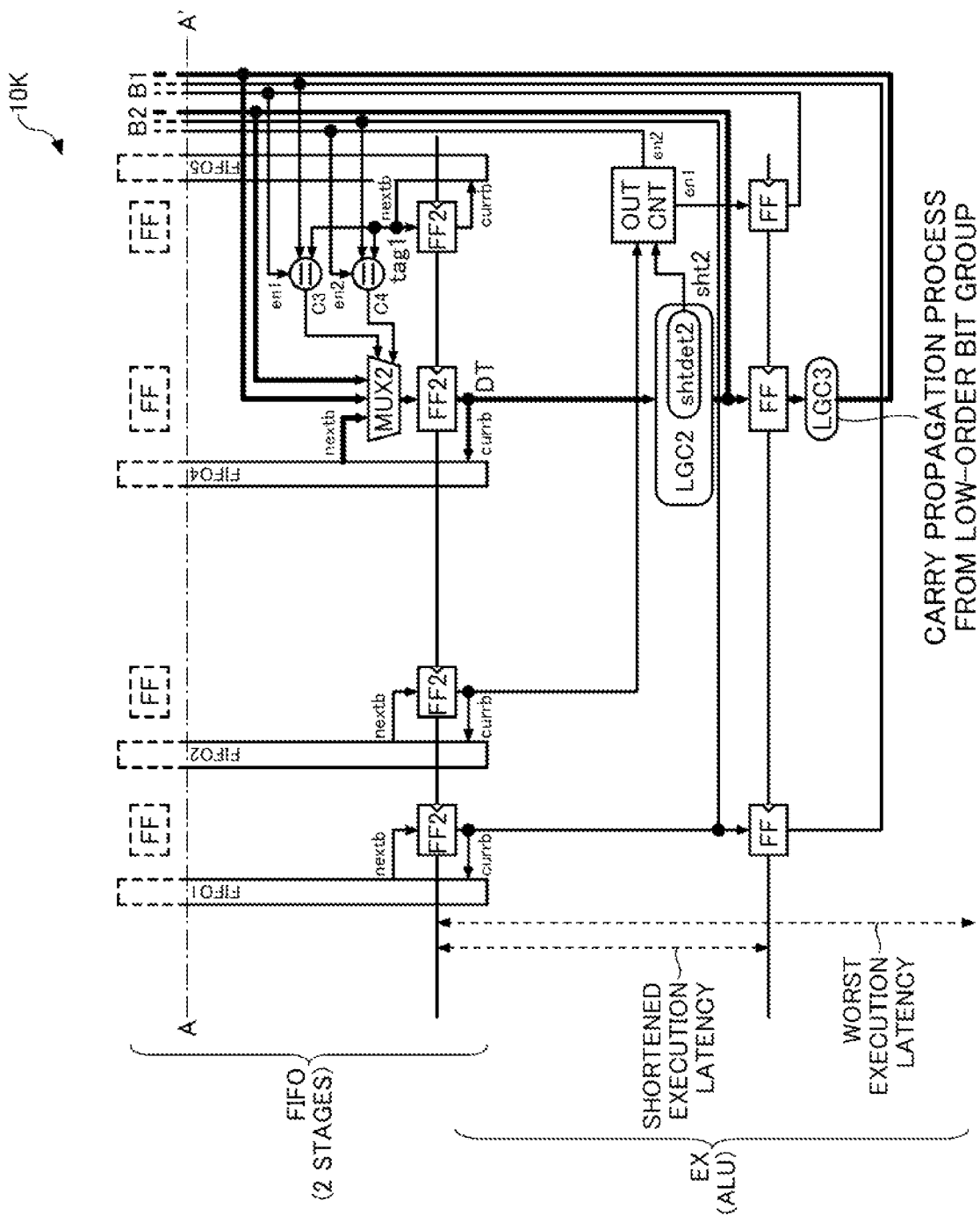
FIG. 28 is a block diagram illustrating the continuation of FIG. 27.

FIGS. 27 and 28 illustrate an example of the main part of the instruction processing apparatus in another embodiment. Elements similar to those in FIGS. 3 and 4 are denoted by the same symbols and detailed descriptions of those elements are omitted. An instruction processing apparatus 10K illustrated in FIGS. 27 and 28 is, for example, a processor such as a CPU.

In the instruction processing apparatus 10K, the circuit related to the shortened flag sht is removed from the instruction processing apparatus 10B illustrated in FIGS. 3 and 4. Therefore, the instruction decoder ID illustrated in FIG. 27 does not have the shortened detecting unit shtdet1 illustrated in FIG. 3. The shortened detecting unit shtdet2 is mounted on the logic circuit LGC2.

The execution unit EX of the instruction processing apparatus 10K includes the arithmetic logic unit ALU including logic circuits LGC2 and LGC3 capable of executing integer addition instructions. The logic circuit LGC2 operates as an integer adder that executes addition processing. The logic circuit LGC3 operates as a carry processor that executes carry propagation processing from a low-order bit group (for example, the lower 16 bits).

In the addition circuit, the carry propagation from a lowest-order bit becomes a critical path. For this reason, in FIG. 28, an integer addition circuit is implemented so that the number of execution stages differs between the case of the worst execution latency in which carry propagation is performed and the case of the shortened execution latency in which carry propagation is not performed. Then, when carry propagation is not performed, the addition result is bypassed with the shortened execution latency.

For example, in the addition of 32 bits to each other, the integer addition circuit illustrated in FIG. 28 separately executes addition of the lower 16 bits to each other and addition of the upper 16 bits to each other in the instruction of the logic circuit LGC2 to generate each carry. When the carry propagates from the lower 16 bits, the integer addition circuit adds "+1" to the upper 16 bits in the instruction of the logic circuit LGC3.

When the carry does not propagate from the lower 16 bits, the shortened detecting unit shtdet2 detects early termination and sets the shortened flag sht2 to "1". That is, the shortened detecting unit shtdet2 detects early termination when the carry processing by the logic circuit LGC3 is unnecessary after the addition by the logic circuit LGC2. The shortened detecting unit shtdet2 sets the shortened flag sht2 to "0" when the carry propagates from the lower 16 bits.

Thus, when the carry does not propagate from the lower 16 bits, the execution result can be bypassed with the shortened execution latency. The instruction scheduler IS illustrated in FIG. 27 issues a preceding instruction (an integer addition instruction) and then issues a subsequent dependent instruction after the shortened execution latency (="1") of the integer addition instruction.

As described above, the same effect as the above described embodiment can be obtained in the present embodiment. For example, the shortened detecting unit shtdet2 can determine whether to bypass the execution result with the shortened execution latency or the worst execution latency. And if the execution result can be output with the shortened execution latency, the execution result can be bypassed with the shortened execution latency.

For example, if the carry does not propagate from the lower 16 bits in an integer addition circuit that divides the addition of 32 bits into the addition of 16 bits, the execution result can be bypassed with the shortened execution latency. As a result, the processing performance of the instruction processing apparatus 10K can be improved compared with the case where the bypass is not performed with the shortened execution latency.

Figure 29:
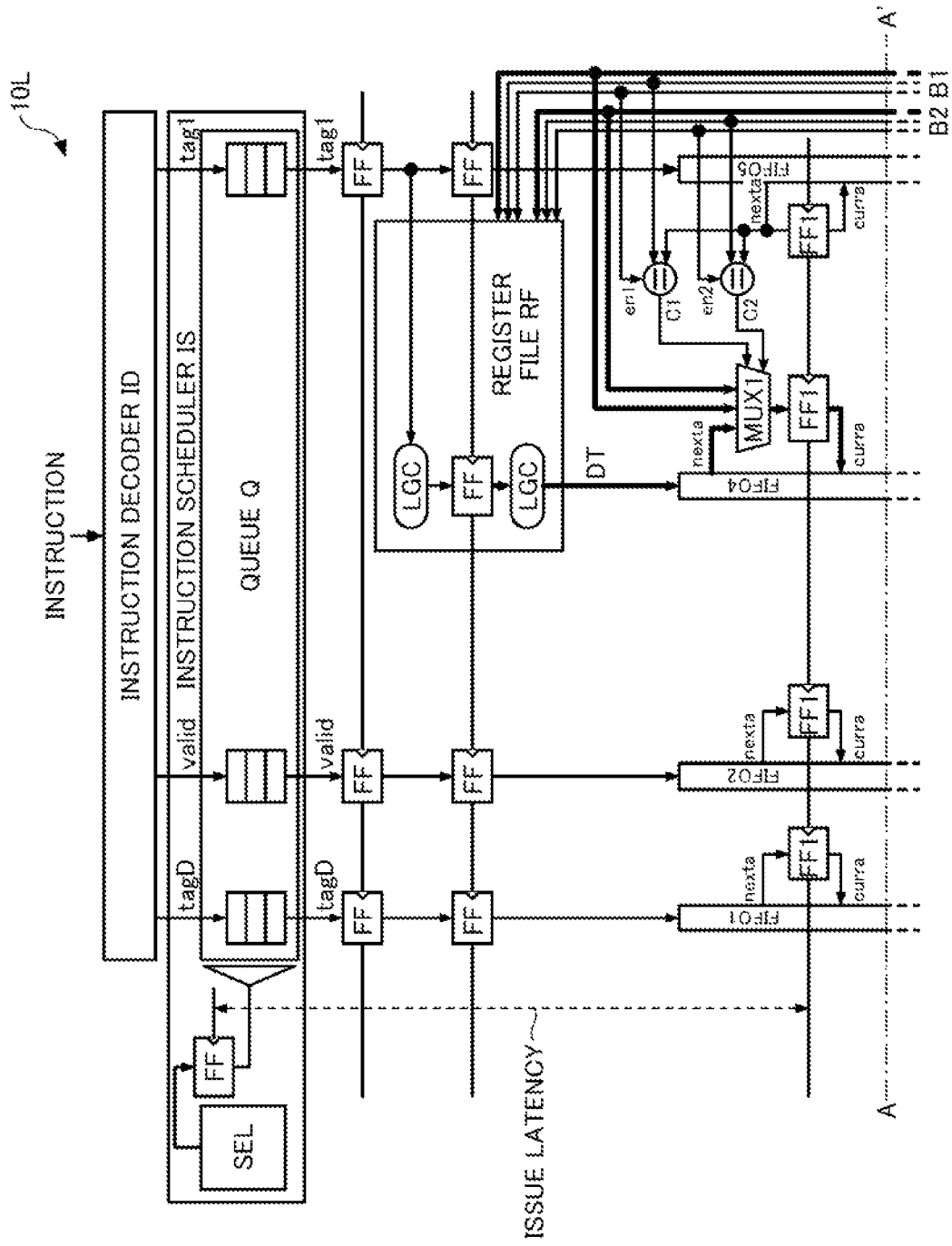
FIG. 29 is a block diagram illustrating an example of the main part of an instruction processing apparatus in another embodiment.
Figure 30:
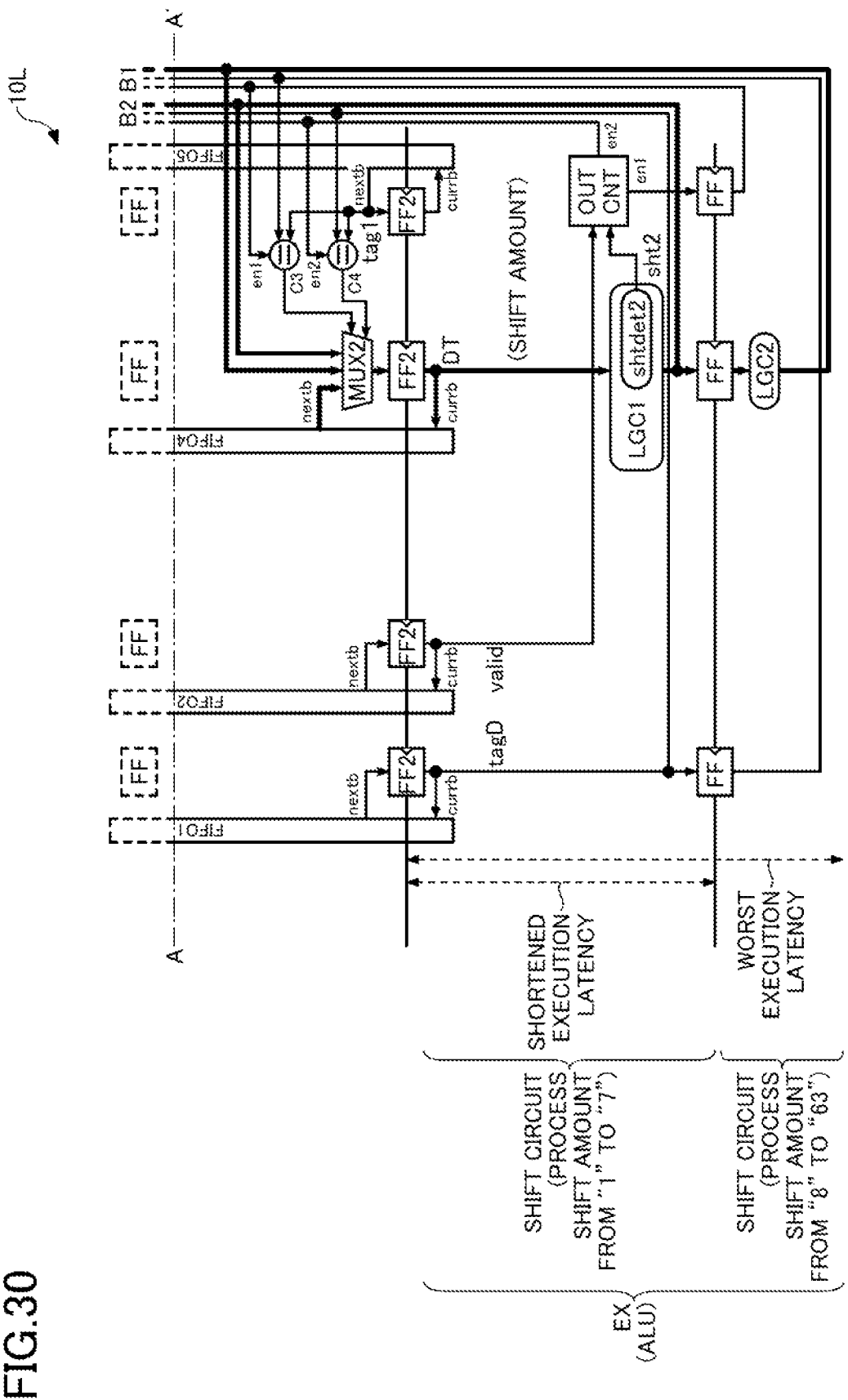
FIG. 30 is a block diagram illustrating the continuation of FIG. 29.

FIGS. 29 and 30 illustrate an example of the main part of the instruction processing apparatus in another embodiment. Elements similar to those in FIGS. 3 and 4 are denoted by the same symbols and detailed descriptions of those elements are omitted. An instruction processing apparatus 10L illustrated in FIGS. 29 and 30 is, for example, a processor such as a CPU.

In the instruction processing apparatus 10L, the circuit related to the shortened flag sht is removed from the instruction processing apparatus 10B illustrated in FIGS. 3 and 4. Therefore, the instruction decoder ID illustrated in FIG. 29 does not include the shortened detecting unit shtdet1 illustrated in FIG. 3. The shortened detecting unit shtdet2 is mounted on the logic circuit LGC1.

The execution unit EX of the instruction processing apparatus 10L includes the arithmetic logic unit ALU (shift circuit) including logic circuits LGC1 and LGC2 connected in series to execute shift instructions, as in FIG. 18. The logic circuit LGC1 processes shift amounts from "1" to "7", and the logic circuit LGC2 processes shift amounts from "8" to "63".

Then, when the shift amount supplied from the register (source operand) is from "1" to "7", the shortened detecting unit shtdet2 detects early termination and sets the shortened flag to "1". When the shift amount supplied from the register (source operand) is from "8" to "63", the shortened detecting unit shtdet2 sets the shortened flag to "0".

Thus, when the shift amount specified by the register is small, the execution result of the shift instruction can be bypassed with the shortened execution latency. The instruction scheduler IS illustrated in FIG. 29 issues a preceding instruction (shift instruction) and then a subsequent dependent instruction after the shortened execution latency of the shift instruction (="1").

As described above, the same effect as the above described embodiment can be obtained in the present embodiment. For example, the shortened detecting unit shtdet2 can determine whether to bypass the execution result with the shortened execution latency or the worst execution latency. Thus, when the execution result can be output with the shortened execution latency, the execution result can be bypassed with the shortened execution latency.

For example, in a shift instruction in which the shift amount is supplied from a register, when the shift amount is small and the execution result can be obtained by the logic circuit LGC1, the execution result can be bypassed with the shortened execution latency. As a result, the processing performance of the instruction processing apparatus 10L can be improved compared with the case in which the instruction is not bypassed with the shortened execution latency.

Note that in the above embodiment, an example in which there is one shortened execution latency has been described. However, multiple shortened execution latencies may be set. For example, two shortened execution latencies may be set by dividing the shift amount of the shift instruction into three stages. That is, when the shortened detecting unit shtdet1 or the shortened detecting unit shtdet2 detects early termination, the output control circuit OUTCNT may bypass any of the execution results that can be bypassed among the multiple execution results in the multiple intermediate stages.

Further, in the above embodiment, an example of bypassing both the execution results output from the execution unit EX with the shortened execution latency and the worst execution latency has been explained. However, only the execution results output with the shortened execution latency are bypassed, and the execution results output with the worst execution latency may be transferred to the register file RF. Note that the execution results output with the shortened execution latency are also transferred to the register file RF.

Furthermore, in the above embodiment, for the sake of simplicity of explanation, an example has been described in which each instruction processing apparatus has an execution unit EX having a floating-point multiply-add circuit FMA, an arithmetic logic unit ALU, a floating-point circuit or a floating-point addition circuit. However, each instruction processing apparatus may have multiple kinds of execution units.

The above detailed description will reveal the features and advantages of the embodiment. It is intended that the claims extend to the features and advantages of the aforementioned embodiment to the extent not to deviate from the spirit and scope of the claim. Further, any person with ordinary knowledge in the art would be able to easily conceive all the improvements and modifications. Therefore, there is no intention to limit the scope of inventive embodiment to those described above, and it is possible to rely on suitable improvements and equivalents within the scope disclosed in the embodiment.

According to an aspect of the embodiments, it is possible to improve the processing performance of the instruction processing apparatus by detecting whether the execution result in the intermediate stage of an execution unit including multiple stages can be bypassed, and bypassing the execution result when possible.

The present invention is not limited to the specific embodiments described herein, and variations and modifications may be made without departing from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustration of the superiority and inferiority of the invention. Although the embodiments of the present invention have been described in detail, it should be understood that the various changes, substitutions, and alterations could be made hereto without departing from the spirit and scope of the invention.

What is claimed is:

1. An instruction processing apparatus comprising a processor configured to execute a process including:
    issuing, by an instruction scheduler, instructions that can be executed;
    holding, by a register file, data used by the instructions;
    executing, by an execution unit including a plurality of stages, the instructions issued by the instruction scheduler;
    detecting, by a detector, early termination in which an execution result of an intermediate stage, which is before a final stage among the plurality of stages, is the same as an execution result of the execution unit; and transferring, by a bypass controller, the data from the register file or the execution result from the execution unit, to an input of the execution unit, and in response to the detector detecting the early termination, bypassing the execution result of the intermediate stage to the input of the execution unit.

2. The instruction processing apparatus according to claim 1,
wherein the process further includes decoding, by an instruction decoder, the instructions and outputting the decoded instructions to the instruction scheduler,
wherein the detecting includes detecting, by the detector that is provided in the instruction decoder, the early termination based on the decoded instructions.

3. The instruction processing apparatus according to claim 2, wherein the issuing by the instruction scheduler includes issuing a subsequent dependent instruction that depends on a preceding instruction that is issued prior to the subsequent dependent instruction, such that a timing when the subsequent dependent instruction is input to the execution unit matches a timing when an execution result of the preceding instruction is input to the execution unit via the bypass controller.

4. The instruction processing apparatus according to claim 1,
wherein the process further includes issuing, by a secondary scheduler, an instruction, which is held in an entry for which a source operand is determined, to the execution unit together with the source operand, the second scheduler being arranged between the instruction scheduler and the execution unit and including a plurality of the entries configured to sequentially hold the instructions issued from the instruction scheduler and the source operands transferred from the bypass controller,
wherein the detector is provided in the execution unit.

5. The instruction processing apparatus according to claim 4, wherein
the issuing by the instruction scheduler includes issuing a subsequent dependent instruction that depends on a preceding instruction that is issued prior to the subsequent dependent instruction, such that a timing when the subsequent dependent instruction is input to the execution unit is earlier than a timing when an execution result of the final stage is input to the execution unit via the bypass controller.

6. The instruction processing apparatus according to claim 2, wherein
the execution unit includes a floating-point multiply-add circuit including a floating-point multiplier and a floating-point adder connected to an output of the floating-point multiplier,
the detecting by the detector includes detecting the early termination in response to detecting that floating-point multiplication is to be executed by the floating-point multiply-add circuit, and
the bypassing by the bypass controller includes bypassing a multiplication result of the floating-point multiplier in response to the detector detecting the early termination.

7. The instruction processing apparatus according to claim 2, wherein
the execution unit includes a logic circuit in which a plurality of shift circuits are connected in series,
the detecting by the detector includes detecting the early termination in response to detecting that a shift instruction, by which a shift amount is given by an immediate value, is to be executed by the plurality of shift circuits, and
the bypassing by the bypass controller includes bypassing the execution result of the intermediate stage in response to the detector detecting the early termination.

8. The instruction processing apparatus according to claim 2, wherein
the execution unit includes a floating-point circuit including a floating-point operator and a rounding processing circuit that adds "+1" to an execution result obtained by the floating-point operator,
the detecting by the detector includes detecting the early termination in response to detecting that a floating-point instruction executed by the floating-point circuit is a rounding mode that does not cause rounding of adding "+1" to the execution result, and
the bypassing by the bypass controller includes bypassing the execution result of the floating-point operator in response to the detector detecting the early termination.

9. The instruction processing apparatus according to claim 4, wherein
the execution unit includes a floating-point multiply-add circuit including a floating-point multiplier and a floating-point adder connected to an output of the floating-point multiplier,
the detecting by the detector includes detecting the early termination in response to detecting that a value to be added to a multiplication result is "0", and
the bypassing by the bypass controller includes bypassing the multiplication result of the floating-point multiplier in response to the detector detecting the early termination.

10. The instruction processing apparatus according to claim 4, wherein
the execution unit includes a floating-point multiply-add circuit including a denormalized number processing circuit that executes a process in response to detecting that an execution result is a denormalized number,
the detecting by the detector includes detecting the early termination in response to detecting that an addition result obtained by the floating-point multiply-add circuit is not a denormalized number, and
the bypassing by the bypass controller includes bypassing the addition result in response to the detector detecting the early termination.

11. The instruction processing apparatus according to claim 4, wherein
the execution unit includes a floating-point circuit including a floating-point operator and a rounding processing circuit that adds "+1" to an execution result obtained by the floating-point operator,
the detecting by the detector includes detecting the early termination in response to detecting that a rounding process of adding "+1" to the execution result obtained by the floating-point operator will not be caused, and
the bypassing by the bypass controller includes bypassing the execution result of the floating-point operator in response to the detector detecting the early termination.

12. The instruction processing apparatus according to claim 4, wherein
the execution unit includes a floating-point addition circuit including a floating-point adder and a normalization processing circuit connected to an output of the floating-point adder, the detecting by the detector includes detecting the early termination in response to detecting that a normalization process after an instruction by the floating-point adder is unnecessary, and the bypassing by the bypass controller includes bypassing an execution result obtained by the floating-point adder in response to the detector detecting the early termination.

13. The instruction processing apparatus according to claim 4, wherein the execution unit includes an integer addition circuit including an integer adder and a carry processor connected to an output of the integer adder, the detecting by the detector includes detecting the early termination in response to detecting that a carry process after addition by the integer adder is unnecessary, and the bypassing by the bypass controller includes bypassing an addition result obtained by the integer adder in response to the detector detecting the early termination.

14. The instruction processing apparatus according to claim 4, wherein the execution unit includes a logic circuit in which a plurality of shift circuits are connected in series, the detecting by the detector includes detecting the early termination in response to detecting that a shift result is obtained in the intermediate stage when a shift instruction for which a shift amount is given from the register file is executed by the logic circuit, and the bypassing by the bypass controller includes bypassing the shift result of the intermediate stage in response to the detector detecting the early termination.

15. The instruction processing apparatus according to claim 4, wherein the executing includes executing, by a plurality of the execution units, one instruction in parallel by using different data from each other, and detecting, by the detector, whether the execution result of the intermediate stage can be bypassed for each of the plurality of the execution units.

16. The instruction processing apparatus according to claim 1, wherein the process further includes selecting, by a selector, an execution result of the intermediate stage or an execution result of the final stage, and outputting the selected execution result to the input of the execution unit, and controlling the selector, by the bypass controller, to select the execution result of the intermediate stage in response to the detector detecting the early termination.

17. The instruction processing apparatus according to claim 1, wherein the bypassing by the bypass controller includes bypassing an execution result that can be bypassed, from among a plurality of execution results of a plurality of the intermediate stages, in response to the detector detecting the early termination.

18. The instruction processing apparatus according to claim 1, wherein the process further includes transferring, to the bypass controller and the register file, the execution result of the intermediate stage to be bypassed, and transferring an execution result of the final stage to the register file.

19. An instruction processing method performed by a processor included in an instruction processing apparatus, the instruction processing method comprising:

issuing, by an instruction scheduler, instructions that can be executed;

holding, by a register file, data used by the instructions;

executing, by an execution unit including a plurality of stages, the instructions issued by the instruction scheduler;

detecting, by a detector, early termination in which an execution result of an intermediate stage, which is before a final stage among the plurality of stages, is the same as an execution result of the execution unit;

transferring, by a bypass controller, the data from the register file or the execution result from the execution unit, to an input of the execution unit, and transferring, by the bypass controller, the execution result of the intermediate stage to the bypass controller, in response to the detector detecting the early termination.

20. An instruction processing apparatus comprising:

an instruction scheduler configured to issue instructions that can be executed;

a register file configured to hold data used by the instructions;

an execution circuit including a plurality of stages and configured to execute the instructions issued by the instruction scheduler;

a detector configured to detect early termination in which an execution result of an intermediate stage, which is before a final stage among the plurality of stages, is the same as an execution result of the execution circuit; and a bypass controller configured to transfer the data from the register file or the execution result from the execution circuit, to an input of the execution circuit, and in response to the detector detecting the early termination, bypass the execution result of the intermediate stage to the input of the execution circuit.

* * * * *